United States Patent
Iwai et al.

(10) Patent No.: US 8,144,746 B2
(45) Date of Patent: Mar. 27, 2012

(54) WIRELESS COMMUNICATION APPARATUS AND WIRELESS COMMUNICATION METHOD

(75) Inventors: Takashi Iwai, Ishikawa (JP); Daichi Imamura, Kanagawa (JP); Sadaki Futagi, Ishikawa (JP); Atsushi Matsumoto, Ishikawa (JP); Tomofumi Takata, Ishikawa (JP)

(73) Assignee: Panasonic Corporation, Osaka (JP)

( * ) Notice: Subject to any disclaimer, the term of this patent is extended or adjusted under 35 U.S.C. 154(b) by 489 days.

(21) Appl. No.: 12/444,366

(22) PCT Filed: Oct. 5, 2007

(86) PCT No.: PCT/JP2007/069557
§ 371 (c)(1),
(2), (4) Date: Apr. 3, 2009

(87) PCT Pub. No.: WO2008/044629
PCT Pub. Date: Apr. 17, 2008

(65) Prior Publication Data
US 2009/0325513 A1    Dec. 31, 2009

(30) Foreign Application Priority Data

Oct. 6, 2006 (JP) ................................ 2006-275640
Nov. 1, 2006 (JP) ................................ 2006-298179

(51) Int. Cl.
*H04B 1/00* (2006.01)
*H04L 27/00* (2006.01)
(52) U.S. Cl. ..................... 375/146; 375/260; 375/295
(58) Field of Classification Search .................. 375/146, 375/260, 267, 295
See application file for complete search history.

(56) References Cited

U.S. PATENT DOCUMENTS

| 7,181,167 | B2 * | 2/2007 | Onggosanusi et al. | ...... 455/63.1 |
|---|---|---|---|---|
| 2001/0014113 | A1 | 8/2001 | Imura | |
| 2003/0117647 | A1 | 6/2003 | Kaku | |
| 2004/0071234 | A1 * | 4/2004 | Li | ................ 375/341 |
| 2007/0004437 | A1 * | 1/2007 | Harada et al. | ................ 455/506 |
| 2007/0165567 | A1 * | 7/2007 | Tan et al. | ................ 370/329 |
| 2007/0230600 | A1 * | 10/2007 | Bertrand et al. | ................ 375/260 |

(Continued)

FOREIGN PATENT DOCUMENTS

JP   2001-223670   8/2001

(Continued)

OTHER PUBLICATIONS

International Search Report dated Nov. 6, 2007.

(Continued)

*Primary Examiner* — David B. Lugo
(74) *Attorney, Agent, or Firm* — Dickinson Wright PLLC

(57) ABSTRACT

A wireless communication apparatus wherein the performance can be prevented from degrading due to the affection of a frequency offset, while the sequence length of Zadoff-Chu sequence (ZC sequence) being kept long. In this wireless communication apparatus, a ZC sequence generating part (11) generates a ZC sequence corresponding to a preamble number that is selected at random and then inputted; a randomizing part (12) randomizes the ZC sequence; a preamble generating part (13) generates a preamble from the randomized ZC sequence; and a radio transmitting part (14) transmits, via an antenna (15), the preamble after subjecting it to predetermined radio transmission processes, such as a D/A conversion, an up-conversion and so on. For example, the randomizing part (12) multiplies the ZC sequence by a PN sequence so as to randomize the ZC sequence.

8 Claims, 22 Drawing Sheets

U.S. PATENT DOCUMENTS

2009/0238137 A1    9/2009    Kishiyama

FOREIGN PATENT DOCUMENTS

| JP | 2007-300314 | 11/2007 |
| JP | 2008-28974 | 2/2008 |
| WO | 02/47304 | 6/2002 |
| WO | 2007/142492 | 12/2007 |

OTHER PUBLICATIONS

3GPP TSG RAN WG1 #46, R1-062004, Tallinn, Estonia, Aug. 28-Sep. 1, 2006, Source: Texas Instruments, Title: Non synchronized Random Access Sequence Design for E-UTRA, Agenda Item: 8.3.1, Document for: Discussion, decision, Aug. 2006, pp. 1-4.

3GPP TSG RAN WG1 Meeting #46, R1-062307, Tallinn, Estonia, Aug. 28-Sep. 1, 2006, Agenda item: 8.3.1, Source: LG Electronics, Title: RACH Design for Large Cell Deployment, Document for: Discussion, Aug. 2006, 6 pages total.

B. Popovic, "Generalized chirp-like polyphase sequences with optimum correlation properties," Information Theory, IEEE Transactions on, vol. 38, Issue 4, Jul. 1992, pp. 1406-1409.

3GPP TSG-RAN WG1 LTE Ad Hoc Meeting, R1-060046, Helsinki, Finland, Jan. 23-25, 2006, Source: NTT DoCoMo, NEC, Sharp, Title:Orthogonal Pilot Channel Structure in E-UTRA Uplink, Agenda Item: 5.2.2.2, Document for: Discussion and Decision, Jan. 2006, pp. 1-8.

3GPP TSG RAN1 LTE WG1 Meeting #46, R1-062306, Tallinn, Estonia, Aug. 28-Sep. 1, 2006, Agenda item: 8.3.1, *Source*: LGE, Title: RACH Sequence Extension Methods for Large Cell Deployment, Document for: Discussion, Aug. 2006, 7 pages total.

Japanese Office Action dated Oct. 25, 2011.

* cited by examiner

WIRELESS COMMUNICATION APPARATUS AND WIRELESS COMMUNICATION METHOD

TECHNICAL FIELD

The present invention relates to a radio communication apparatus and a radio communication method.

BACKGROUND ART

Presently, in 3GPP RAN LTE (long term evolution) studies are conducted on the preamble a mobile station first transmits in random access between mobile stations and a base station in RACH (Random Access Channel) For the preamble, a known sequence between the mobile stations and the base station is used. The base station needs to detect different preambles from a plurality of mobile stations based on correlation values of the sequences and detect reception timings with accuracy, so that the sequences used as preambles should have good autocorrelation characteristics and cross-correlation characteristics, and have low PAPR (Peak to Average Power Ratio).

One of sequences of good autocorrelation characteristics and cross-correlation characteristics and of low PAPR is a Zadoff-Chu sequence (hereinafter simply "ZC sequence") (see Non-Patent document 1). A ZC sequence is represented by $a_r(k)$ in equation 1. Here, N is the sequence length and r is the sequence number (N and r are coprime), and q is an arbitrary integer. The feature of a ZC sequence includes good autocorrelation characteristics and relatively little cross-correlation characteristics, that is, the cross-correlation is $\sqrt{N}$ if N is a prime number.

(Equation 1)

$$a_r(k) = \begin{cases} e^{-j\frac{2\pi r}{N}(k^2/2+qk)}, & N:\text{even} \\ e^{-j\frac{2\pi r}{N}(k(k+1)/2+qk)}, & N:\text{odd} \end{cases} \quad [1]$$

Further, in 3GPP RAN LTE, studies are conducted on a cyclic-shifted ZC sequence (hereinafter, simply "CS-ZC sequence"), which is a sequence where a ZC sequence is cyclically shifted (see Non-patent Document 2). As shown in FIG. 1, CS-ZC sequences are generated by cyclically shifting one ZC sequence. FIG. 1 shows an example with seven CS-ZC sequences, that is, CS-ZC sequences #1 to #7 that are generated by cyclically shifting ZC sequence #1 (shift zero) of sequence length N=293 by the amount of shift Δ=36. These CS-ZC sequences #1 to #7 are orthogonal to each other if the propagation delay time of a mobile station does not exceed the amount of shift and the cross-correlation between the sequences is zero, so that the accuracy of preamble detection is high when a CS-ZC sequence is used as a preamble.

Further, in 3GPP RAN LTE, the preamble length that can support a cell radius up to 30 km is studied. To secure a received S/N needed for preamble detection, it is necessary to make the preamble length longer and increase the energy of the preamble signal when the cell radius is greater and propagation attenuation increases. That is, in cases where a CS-ZC sequence is used as a preamble, it is necessary to make the sequence length of a ZC sequence longer when the cell radius is greater.

Here, as a method of acquiring the sequence length according to the cell radius with regards to a ZC sequence, two methods, that is, a method of extending sequence length N (i.e. sequence extension method) and a method of repeating a ZC sequence having sequence length N (i.e. sequence repetition method) are studied (see Non-patent Documents 3 and 4). If the sequence extension method is used in these methods, it is possible to generate many more ZC sequences and obtain a larger number of ZC sequences that can be used in the entire communication system. That is, the sequence extension method provides an advantage of increasing the reuse factor of sequences and making cell planning easy. The reuse factor equals the value dividing the number of ZC sequences that can be used in the entire communication system by the number of ZC sequences assigned per cell, and is proportional to the number of ZC sequences. In cases where a ZC sequence whose sequence length N is a prime number and whose correlation characteristics are good is used, N−1 ZC sequences can be generated, and the reuse factor is proportional to sequence length N. Consequently, as a method for acquiring the sequence length according to the cell radius with regards to ZC sequences, the sequence extension method becomes more focus of attention.

Non-patent Document 1: Popvic, "Generalized chirp-like polyphase sequences with optimal correlation properties," IEEE Transactions on information Theory, July 1992, 1406-1409

Non-patent Document 2: 3GPP, R1-060046, NTT DoCoMo, "Orthogonal Pilot Channel Structure in E-UTRA Uplink"

Non-patent Document 3: 3GPP, R1-062004, Texas Instruments, "Non-Synchronized Random Access Sequence Design for E-UTRA"

Non-patent Document 4: 3GPP, R1-062306, LG, "RACH Sequence Extension Methods for Large Cell Deployment"

DISCLOSURE OF INVENTION

Problems to be Solved by the Invention

However, as the ZC sequence length becomes longer, there is a problem that influence of frequency offset produced by Doppler shift and frequency offset produced by a clock difference between the mobile station and the base station increases and the accuracy of preamble detection deteriorates.

A ZC sequence has nature of a chirp signal (i.e. a signal whose frequency varies over time). F(ω) in equation 2 represents the frequency component of the ZC sequence calculated by Fourier transforming the ZC sequence $a_r(k)$ (time signal) represented in equation 1. Here, as time k of the ZC sequence changes by Δ, as shown in equation 3, frequency offset proportional to Δ is added. That is, if frequency offset is added to a ZC sequence, this frequency offset appears as a timing offset in the base station of the preamble receiving side.

(Equation 2)

$$\int a_r(k)e^{-j\omega k}dk = \int e^{-j\frac{2\pi r}{N}(k(k+1)/2+qk)}e^{-j\omega k}dk = F(\omega) \quad [2]$$

-continued (Equation 3)

$$\int a_r(k+\Delta)e^{-j\omega k}dk = \int e^{-j\frac{2\pi r}{N}((k+\Delta)(k+\Delta+1)/2+q(k+\Delta))}e^{-j\omega k}dk = \quad [3]$$

$$\left(e^{-j\frac{2\pi r}{N}(\Delta(\Delta+1)/2+q\Delta)}\right)\int e^{-j\frac{2\pi r}{N}(k(k+1)/2+qk)}e^{-j(\omega+\frac{2\pi r}{N}\Delta)k}dk =$$

$$A \cdot F\left(\omega + \frac{2\pi r}{N}\Delta\right)$$

Where A is a fixed value, $A = e^{-j\frac{2\pi r}{N}(\Delta(\Delta+1)/2+q\Delta)}$ FIGS. 2A and 2B show delay profiles (i.e. auto-correlation levels with respect to reception timings) the present inventors have obtained by computer simulations. Here shows the delay profile in the case of a 0 Hz frequency offset (FIG. 2A) and the delay profile in the case of a 600 Hz frequency offset (FIG. 2B). In both cases, the TTI length is 1 ms as described above.

As apparent from FIGS. 2A and 2B, when the frequency offset is added, interference peaks occur at timings different from the reception timing of the received signal (FIG. 2B). Random access has an object of detecting reception timings to establish uplink synchronization by a mobile station. However, if the large interference peaks occur in this way, the base station cannot distinguish a peak of a received signal and an interference peak. That is, by an interference peak occurred due to frequency offset, the accuracy of detection of reception timings is deteriorated in the base station.

As apparent from FIGS. 2A and 2B, if frequency offset is added, the autocorrelation level of the received signal decreases, and therefore the accuracy of reception timing detection is deteriorated. The decrease of this autocorrelation level is caused by the phase rotation due to frequency offset within the correlation length, that is, within the ZC sequence length.

Further, in cases where a CS-ZC sequence is used as a preamble, if a 600 Hz frequency offset is added, as shown in FIG. 3, interference peaks in CS-ZC sequence #1 appear in the delay profile windows of CS-ZC sequences #2 and #3. For this reason, it is likely to incorrectly detect CS-ZC sequence #1 as CS-ZC sequences #2 and #3. That is, in the case of using a CS-ZC sequence as a preamble, if frequency offset is added, the rate of detecting errors of CS-ZC sequences in the base station increases.

Further, FIG. 4 shows the result of the robustness with respect to frequency offset the present inventors have evaluated by computer simulations. FIG. 4 shows a chart showing the maximum value of the signal level and the maximum value of the interference level with respect to frequency offset. Referring to FIG. 4 signal level S decreases and interference level I increases, when frequency offset increases. When the frequency offset exceeds 700 Hz, interference level I exceeds signal level S, and therefore it is difficult to detect a received signal accurately in the receiving side.

It is therefore an object of the present invention to provide a radio communication apparatus and radio communication method that can prevent performance deterioration due to influence of frequency offset while maintaining the ZC sequence length long.

Means for Solving the Problem

The radio communication apparatus of the present invention adopts a configuration including: a randomization section that randomizes a Zadoff-Chu sequence or a cyclic-shifted Zadoff-Chu sequence; and a transmitting section that transmits the randomized Zadoff-Chu sequence or the randomized cyclic-shifted Zadoff-Chu sequence.

Advantageous Effect of the Invention

According to the present invention, it is possible to prevent performance deterioration due to influence of frequency offset while maintaining the ZC sequence length long.

BEST MODE FOR CARRYING OUT THE INVENTION

Now, embodiments of the present invention will be described in detail with reference to the accompanying drawings.

Embodiment 1

Figure 5:
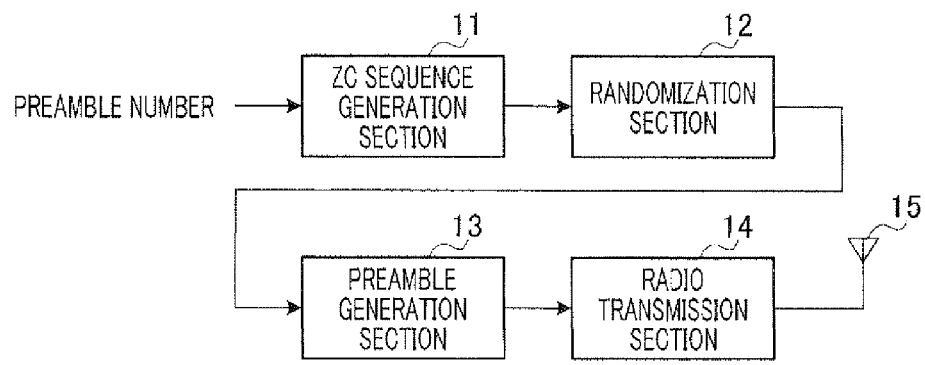
FIG. 5 is a block diagram showing the configuration of the radio communication apparatus (preamble transmitting side) according to Embodiment 1 of the present invention.

FIG. 5 shows radio communication apparatus 10 of the preamble transmitting side, according to the present embodiment. This radio communication apparatus 10 is mainly used with a mobile station apparatus in a mobile communication system. Similarly, the radio communication apparatus of the preamble transmitting side according to other embodiments, is used with a mobile station apparatus in a mobile communication system.

As shown in radio communication apparatus 10 shown in FIG. 5, ZC sequence generation section 11 generates a ZC sequence or CS-ZC sequence associated with a preamble number selected and inputted on a random basis, and outputs the generated sequence to randomization section 12. Hereinafter, although a case will be explained where ZC sequence generation section 11 generates a CS-ZC sequence, the present embodiment may also be implemented as in the following explanation in cases where ZC sequence generation section 11 generates a ZC sequence. The same applies to other embodiments.

Randomization section 12 randomize the CS-ZC sequence and outputs the randomized sequence to preamble generation section 13. Randomization section 12 will be explained in detail later.

Preamble generation section 13 generates a preamble formed with the randomized CS-ZC sequence, and outputs the preamble to radio transmission section 14.

Radio transmission section 14 performs radio transmission processing including D/A conversion and up-conversion on the preamble, and transmits the preamble from antenna 15. At this time, radio transmission section 14 transmits the preamble in RACH. That is, radio transmission section 14 transmits the randomized CS-ZC sequence as a random access preamble.

Figure 6:
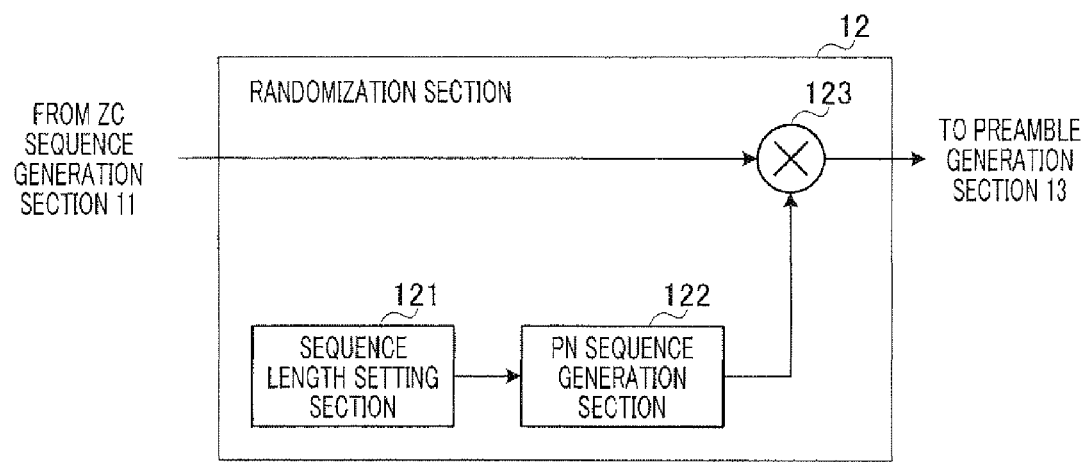
FIG. 6 is a block diagram showing the configuration of the randomization section according to Embodiment 1 of the present invention.

Next, randomization section 12 will be explained in detail. FIG. 6 shows the configuration of randomization section 12 according to the present embodiment.

In randomization section 12 shown in FIG. 6, sequence length setting section 121 sets the sequence length (PN sequence length) of a PN sequence (Pseudo Noise sequence), which is a random sequence, in PN sequence generation section 122. Sequence length setting section 121 sets the PN sequence length longer than the maximum propagation delay time of a transmission signal assumed in advance in RACH.

Here, if the PN sequence length is shorter than a propagation delay time of the mobile station, when the preamble receiving side calculates correlations by the PN sequence, correlation peaks occur at points where the PN sequence is repeated, and, as a result, the preamble receiving side incorrectly detects reception timings. To prevent from this incorrect detections, with the present embodiment, the PN sequence length is set longer than the maximum propagation delay time of the RACH. By this means, the preamble receiving side can detect reception timings accurately.

Interference between PN sequences can be reduced when the PN sequence length is longer. However, in correlation calculation in the preamble receiving side, phase rotations by frequency offset increase within the correlation length, that is, within the PN sequence length when the PN sequence length is longer. As a result, the signal level deteriorates significantly. On the other hand, when the PN sequence length is shorter, influence of the phase rotations decreases and the signal level deterioration can be reduced, but the interference between PN sequences increases.

Consequently, the PN sequence length may be set in the range longer than the maximum propagation delay time assumed in advance in RACH according to allowable frequency offsets.

Further, the cyclic shift length of a CS-ZC sequence is set optimal in advance based on the maximum propagation delay time depending on the cell radius. Therefore, when a CS-ZC sequence is used as a preamble, the PN sequence length is preferably set as same as the cyclic shift length of the CS-ZC sequence. By this means, it is possible to set the PN sequence length to be an optimal length according to the maximum propagation delay time which varies depending on the cell radius. Further, the cyclic shift length of a CS-ZC sequence is known to both the preamble transmitting side and the preamble receiving side, so that, by setting the PN sequence length as same as the cyclic shift length of a CS-ZC sequence, signaling for reporting the PN sequence length from the transmitting side to the receiving side is unnecessary.

PN sequence generation section 122 generates a PN sequence having a length set by sequence length setting section 121, extends this generated PN sequence to the ZC sequence length, and outputs the extended PN sequence to multiplication section 123. Now, a PN sequence extended to the ZC sequence length is referred to as the "extended PN sequence."

To reduce interference between PN sequences and improve the accuracy of detection, a sequence both having good autocorrelation characteristics and good cross-correlation characteristics may be used for a PN sequence. For example, an M sequence, a Gold sequence, an orthogonal Gold sequence and a Walsh-Hadamard sequence may be applicable. Accordingly, in the present embodiment, any of a PN sequence, an M sequence, a Gold sequence, an orthogonal Gold sequence and a Walsh-Hadamard sequence may be used as a random sequence. It is possible to generate more orthogonal sequences when a Walsh-Hadamard sequence is used.

Further, as for the method of extending a PN sequence to the ZC sequence length, the same PN sequence may be repeated a plurality of times, and, a plurality of different PN sequences may be concatenated in use. In cases of employing the former extension method, correlation calculation is cyclically performed for correlation calculation by PN sequences, so that it is possible to reduce interference between PN sequences even when the delayed wave occurs. Meanwhile, in cases of employing the latter extension period, by associating contents of control information with combinations of PN sequences, it is possible to use a PN sequence as a preamble as control information.

Figure 7:
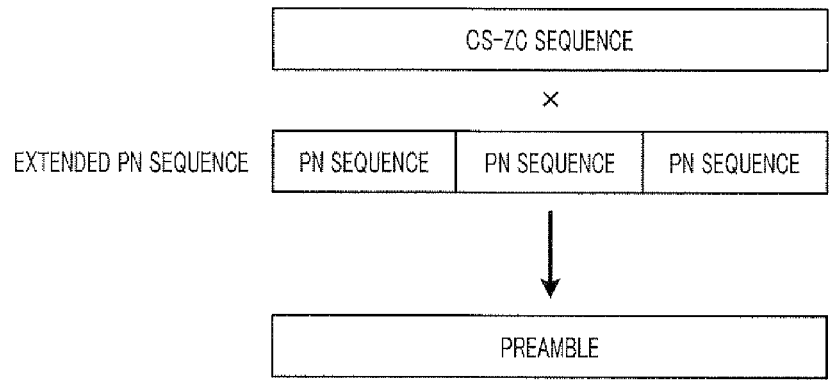
FIG. 7 illustrates the operation of the multiplication section according to Embodiment 1 of the present invention.

Referring to FIG. 7, multiplication section 123 multiplies the CS-ZC sequence received as input from ZC sequence generation section 11 by the extended PN sequence received as input from PN sequence generation section 122, and outputs the multiplied sequence to preamble generation section 13. By this means, it is possible to randomize a CS-ZC sequence and remove the nature of a chirp signal from the CS-ZC sequence. It a ±1 random sequence is used as a PN sequence, by multiplying a CS-ZC sequence and this together, the phase of the CS-ZC sequence is reversed 180 degrees on a random basis, and the CS-ZC sequence after the multiplication by the PN sequence is a random sequence having lost nature of a chirp signal.

Then, as shown in FIG. 7, preamble generation section 13 generates a preamble formed with the CS-ZC sequence randomized by the extended PN sequence, and outputs the generated preamble to radio transmission section 14.

Figure 8:
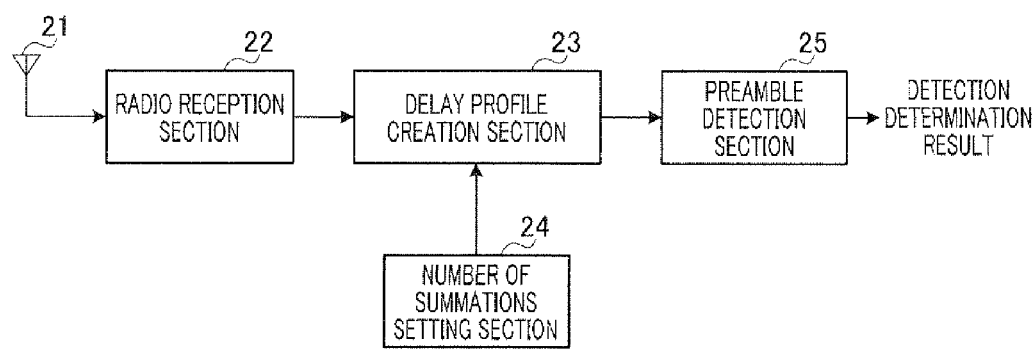
FIG. 8 is a block diagram showing the configuration of the radio communication apparatus (preamble receiving side) according to Embodiment 1 of the present invention.

Next, FIG. 8 shows radio communication apparatus 20 of the preamble receiving side according to the present embodiment. This radio communication apparatus 20 is mainly used with a base station apparatus in a mobile communication system. Similarly, the radio communication apparatus of the preamble receiving side according to other embodiments, is used with a base station apparatus in a mobile communication system.

In radio communication apparatus 20 shown in FIG. 8, radio reception section 22 performs radio receiving processing including down-conversion, A/D conversion on a received signal via antenna 21, and outputs the signal to delay profile creation section 23.

Number of summations setting section 24 sets the number of power summations for the delay profile created in delay profile creation section 23.

Here, the number of power summations is any number from one to the number of PN sequences used in the randomization of the CS-ZC sequence. That is, as shown in FIG. 7, when the number of PN sequences used in the randomization of the CS-ZC sequence is three, number of summations setting section 24 sets the number of power summations in one of one to three.

Further, when the number of power summations increases (i.e. when the correlation length is shorter), signal level deterioration due to frequency offset can be reduced, but interference between PN sequences increases. By contrast with this, when the number of power summations decreases (i.e. when the correlation length is longer), the interference between PN sequences can be reduced, but signal level deterioration due to influence of frequency offset increases. Consequently, the number of power summations may preferably be set according to allowable frequency offsets.

For example, by setting the number of power summations per base station depending on assumed frequency offset, it is possible to improve the accuracy of preamble detection. To be more specific, the base station installed near railroads for rapid transit trains or highways, by increasing the number of power summations, it is possible to reduce deterioration of the accuracy of preamble detection due to significant frequency offset.

Further, the number of power summations may be set per mobile station (that is, per received preamble). At this time, by detecting frequency offset level from the received preamble and setting the number of power summations according to the frequency offset level, it is possible to improve the accuracy of preamble detection.

Figure 9:
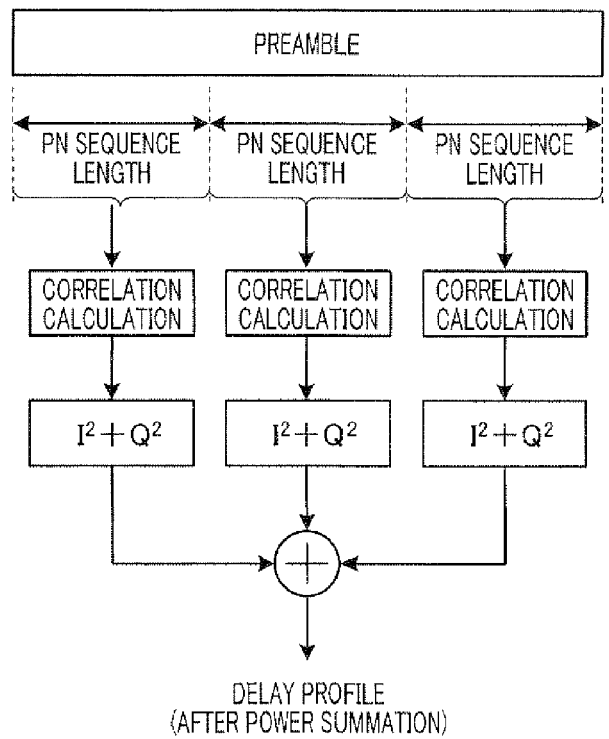
FIG. 9 illustrates the operation (the number of summations is three) of the delay profile creation section according to Embodiment 1 of the present invention.
Figure 10:
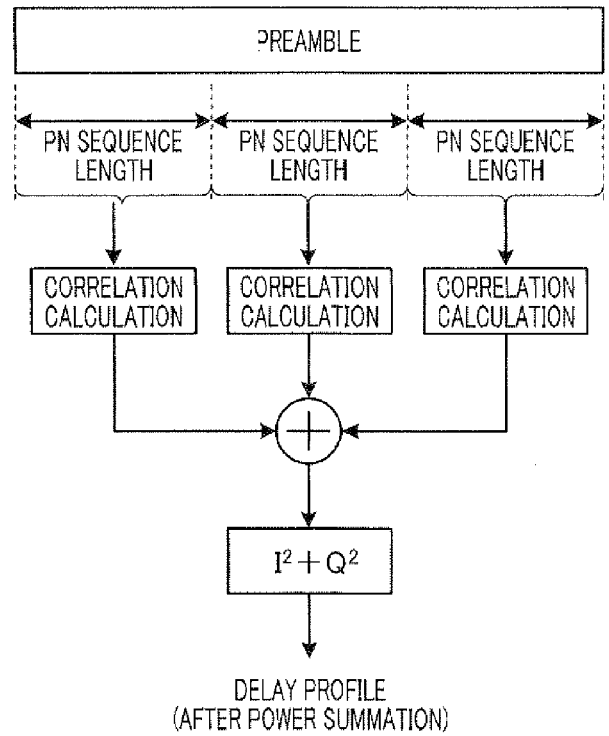
FIG. 10 illustrates the operation (the number of summations is one) of the delay profile creation section according to Embodiment 1 of the present invention.

As shown in FIGS. 9 and 10, delay profile creation section 23 performs correlation calculation between the preamble of the received signal and the sequence pattern of the known preamble (i.e. a pattern obtained as a result of multiplying the CS-ZC sequence by the extended PN sequence) in PN sequence length units, to create a delay profile. Then, according to the number of power summations received as input from number of summations setting section 24, delay profile creation section 23 performs power summation of a plurality of delay profiles obtained from the correlation calculation in PN sequence length units, and outputs the delay profile after the power summation to preamble detection section 25.

If the number of power summation is set three, as shown in FIG. 9, delay profile creation section 23 individually finds the power of three delay profiles generated by correlation calculation in PN sequence units, and then performs power summation of the three delay profiles. Meanwhile, if the number of power summation is set one, as shown in FIG. 10, delay profile creation section 23 combines three delay profiles generated by correlation calculation in PN sequence units, and then finds the power of the delay profile after the combination. In FIGS. 9 and 10, $I^2+Q^2$ represents power calculation processing for an Ich component and a Qch component.

Preamble detection section 25 detects the correlation peak in the delay profile after the power summation received as input from delay profile creation section 23, and performs preamble detection determination (determining whether a preamble is detected or not) by comparing the correlation peak and a predetermined threshold. Then, preamble detection section 25 outputs the detection determination result.

Figure 11A:
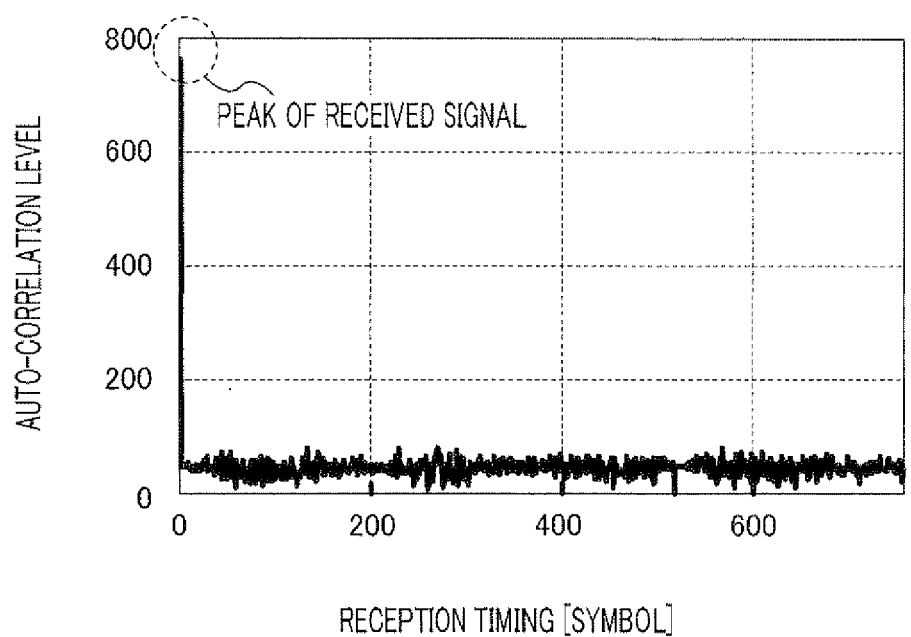
FIG. 11A shows a delay profile (0 Hz frequency offset) according to Embodiment 1 of the present invention.
Figure 11B:
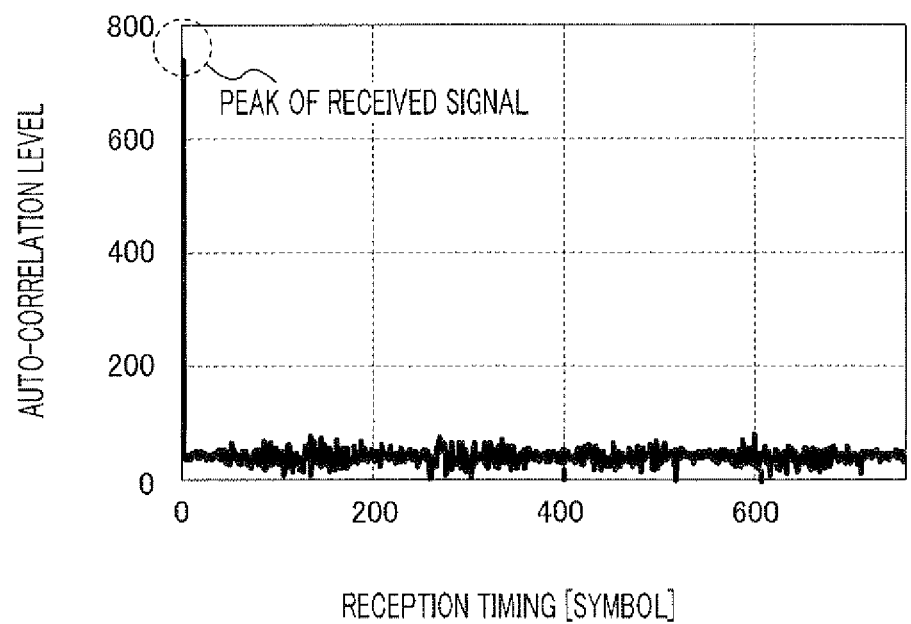
FIG. 11B shows a delay profile (600 Hz frequency offset) according to Embodiment 1 of the present invention.

FIGS. 11A and 11B show delay profiles the present inventors have obtained by computer simulations. Here, as described above, FIG. 11A shows the case of a 0 Hz frequency offset and FIG. 11B shows the case of a 600 Hz frequency offset. In both cases, the TTI length is 1 ms as described above.

Figure 1:
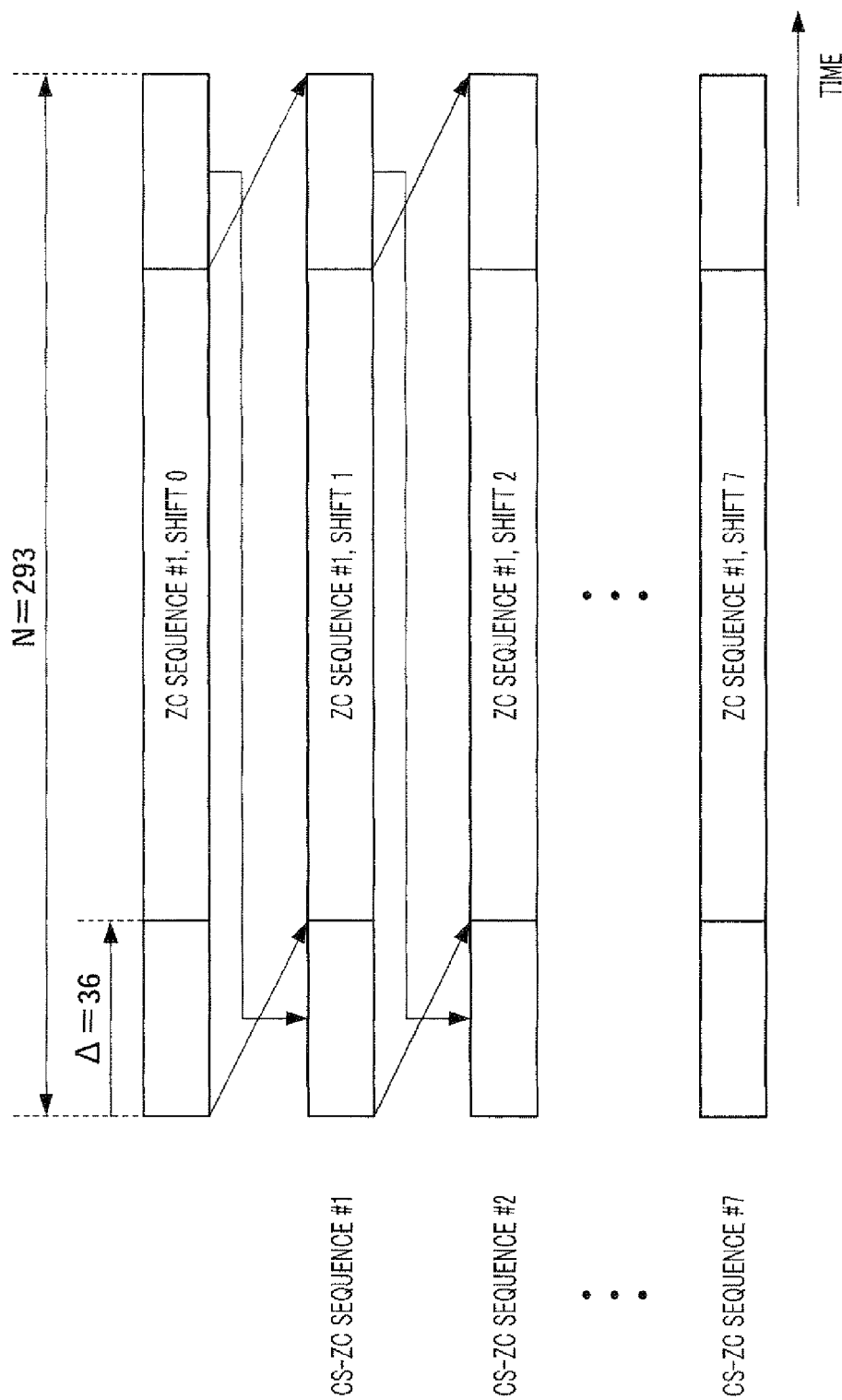
FIG. 1 shows an example of a conventional CS-ZC sequence.
Figure 2A:
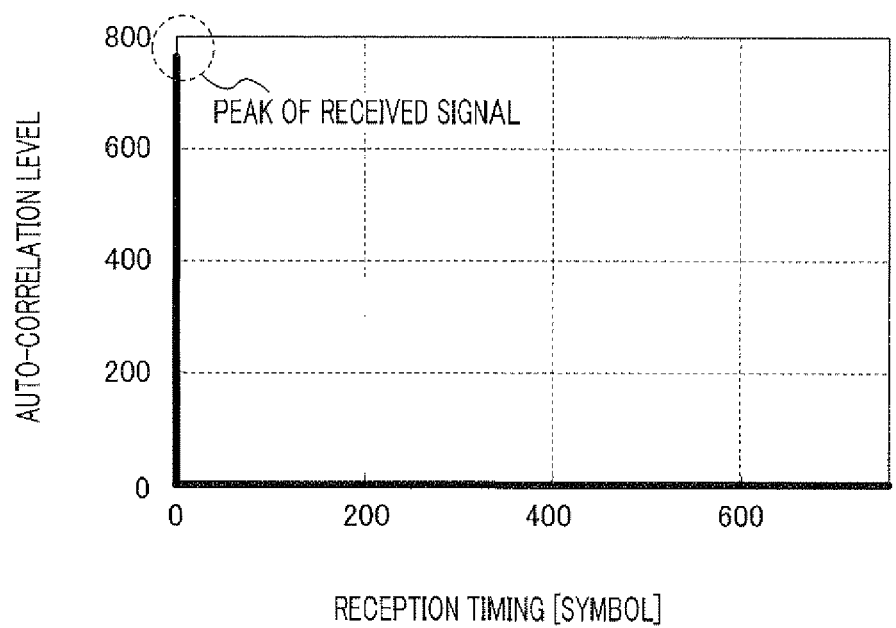
FIG. 2A shows a delay profile (0 Hz frequency offset) in cases where a conventional technique is used.
Figure 2B:
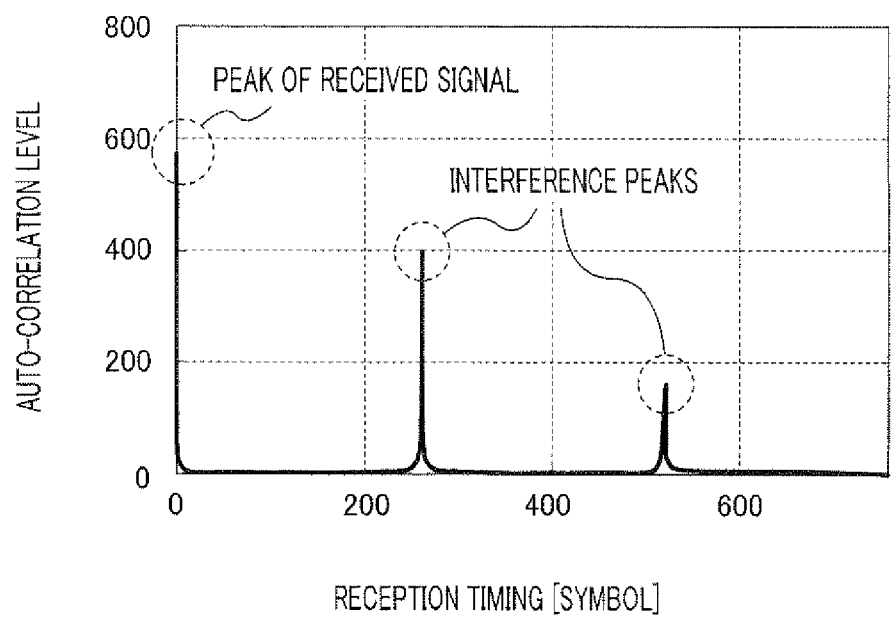
FIG. 2B shows a delay profile (600 Hz frequency offset) in cases where a conventional technique is used.
Figure 3:
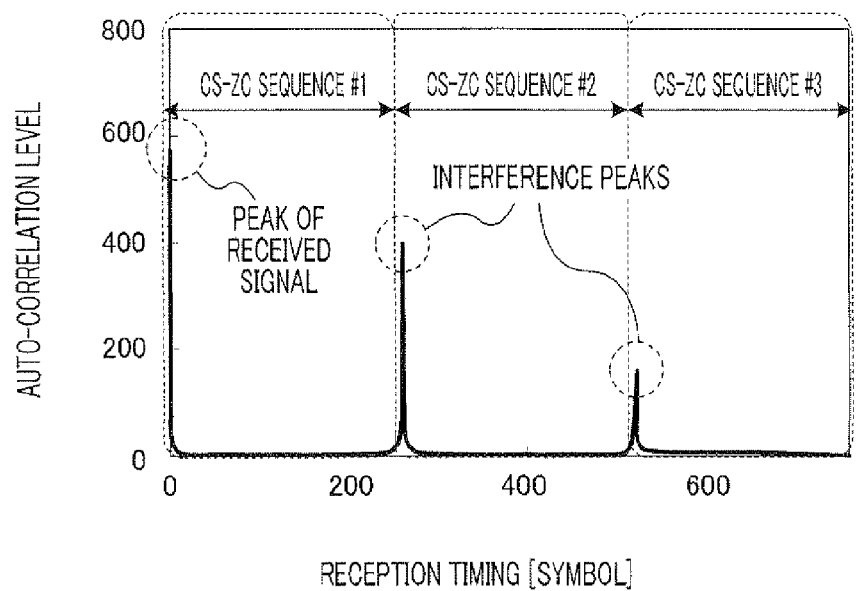
FIG. 3 shows a delay profile (600 Hz frequency offset) in cases where a conventional technique is used.
Figure 4:
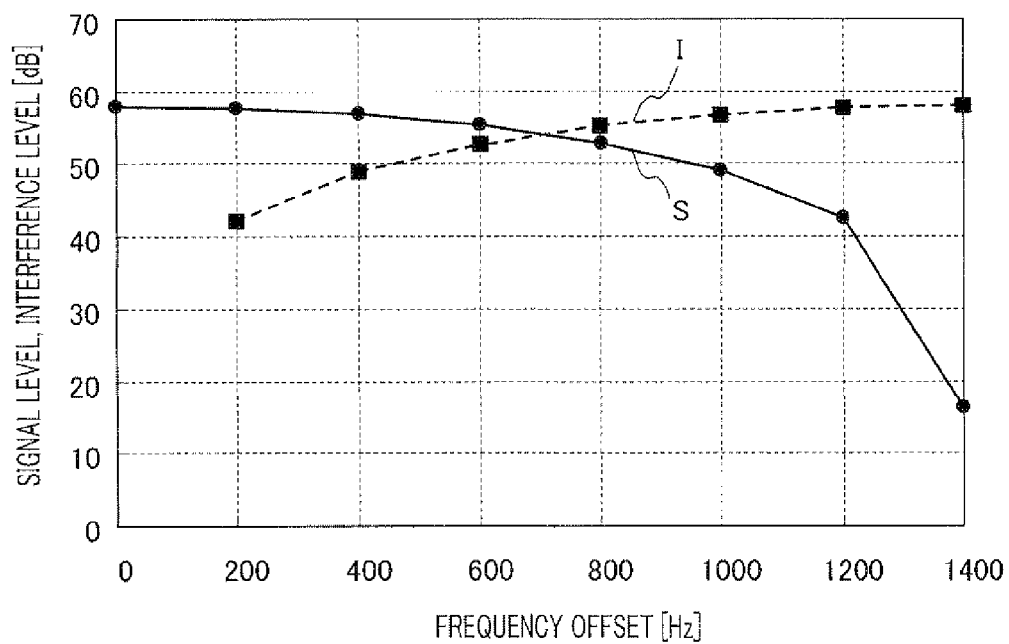
FIG. 4 shows the result of robustness evaluation with respect to frequency offset in cases where a conventional technique is used.

As apparent from FIGS. 11A and 11B according to the present embodiment, even if frequency offset is added, it is different from conventional cases (FIGS. 2A and 2B) the autocorrelation level of the received signal does not decrease and interference peaks do not occur.

Figure 12:
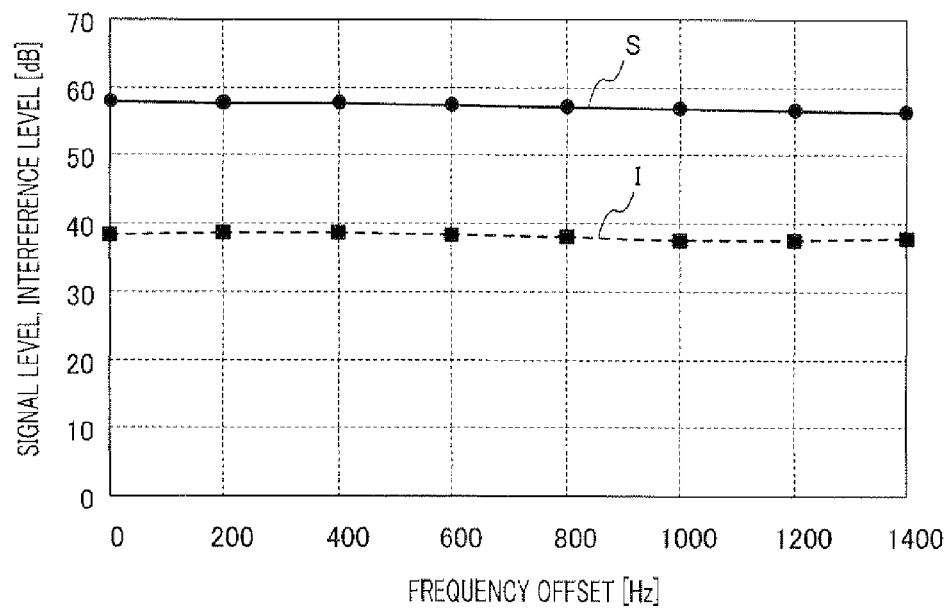
FIG. 12 shows the result of robustness evaluation with respect to frequency offset according to Embodiment 1 of the present invention.

Further, FIG. 12 shows the result of the robustness with respect to frequency offset the present inventors have evaluated by computer simulations. As described above, the chart of FIG. 12 shows the maximum value of the signal level and the maximum value of the interference level with respect to frequency offset. Referring to FIG. 12, according to the present embodiment, even if frequency offset increases, signal level S and interference level I change little. Further, even if the frequency offset exceeds 700 Hz, signal level S is much greater than interference level I. That is, according to the present embodiment, it is possible to detect a preamble accurately.

In this way, according to the present embodiment, by multiplying a ZC sequence or a CS-ZC sequence used as a preamble by a PN sequence, the ZC sequence or the CS-ZC sequence is randomized, so that it is possible to prevent interference peaks occurred by frequency offset from producing. Consequently, according to the present embodiment, it is possible to prevent deterioration of the accuracy of detection of reception timings and prevent error detections caused by frequency offset in cases where a ZC sequence or a CS-ZC sequence is used as a preamble.

Further, according to the present embodiment, by performing correlation calculation in optimal PN sequence length units according to assumed frequency offset, the length of correlation can be made shorter, so that it is possible to reduce signal level deterioration due to the influence of frequency offset. As a result, it is possible to improve the rate of detecting preambles.

Further, according to the present embodiment, the PN sequence length can be set shorter than the ZC sequence length, so that it is possible to prevent performance deterioration due to the influence of frequency offset while maintaining the ZC sequence extended under sequence extension method.

Further, according to the present embodiment, a conventional CS-ZC sequence is used as is, so that it is possible to prevent performance deterioration due to the influence of frequency offset while maintaining the same reuse factor as in a conventional case.

Embodiment 2

The present embodiment differs from embodiment 1 in that a ZC sequence or a CS-ZC sequence is randomized by interleaving the ZC sequence or the CS-ZC sequence.

Figure 13:
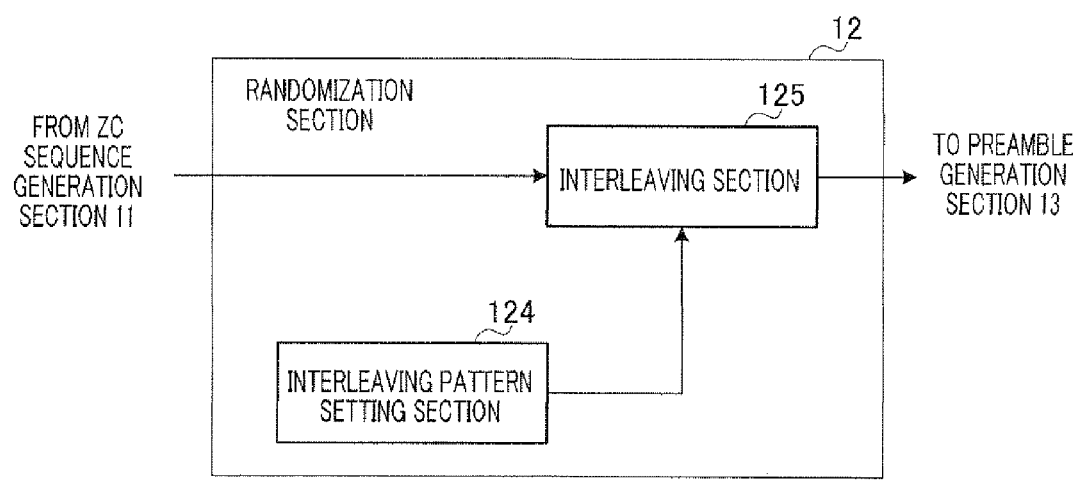
FIG. 13 is a block diagram showing the configuration of the randomization section according to Embodiment 2 of the present invention.

FIG. 13 shows a configuration of randomization section 12 according to the present embodiment.

In randomize section 12 shown in FIG. 13, interleaving pattern setting section 124 sets a random interleaving pattern in interleaving section 125.

Interleaving section 125 interleaves (i.e. reorders a sequence) the CS-ZC sequence received as input from ZC sequence generation section 11 according to the interleaving pattern set by interleaving pattern setting section 124, and outputs the interleaved sequence to preamble generation section 13. In this way, by interleaving a CS-ZC sequence, as in Embodiment 1, a CS-ZC sequence is randomized and it is possible to remove the nature of a chirp signal from the CS-ZC sequence.

Figure 14:
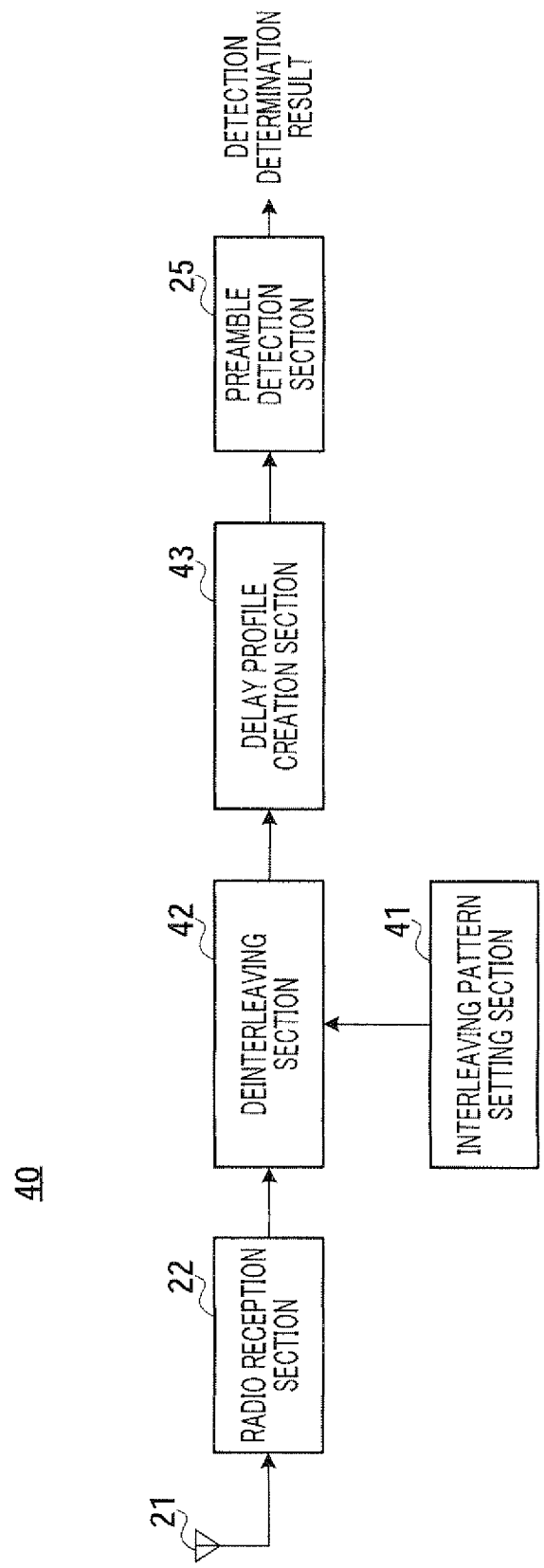
FIG. 14 is a block diagram showing the configuration of the radio communication apparatus (preamble receiving side) according to Embodiment 2 of the present invention.

Next, FIG. 14 shows the configuration of radio communication apparatus 40 of the preamble receiving side according to the present embodiment. In FIG. 14, the same reference numerals will be assigned to the same components as in FIG. 8 (Embodiment 1), and description thereof will be omitted.

In radio communication apparatus 40 shown in FIG. 14, interleaving pattern setting section 41 sets the same interleaving pattern as the interleaving pattern set by interleaving pattern setting section 124, in deinterleaving section 42.

Deinterleaving section 42 deinterleaves a preamble of the received signal (i.e. reorders in reverse order of the reorder in interleaving section 125), and outputs the interleaved preamble to delay profile creation section 43.

Delay profile creation section 43 performs correlation calculation between the preamble after the deinterleaving and the sequence pattern of the known preamble (i.e. the sequence pattern of a ZC sequence), to create a delay profile. Other processing in delay profile creation section 43 is the same as in Embodiment 1, therefore the explanation is omitted.

Figure 15A:
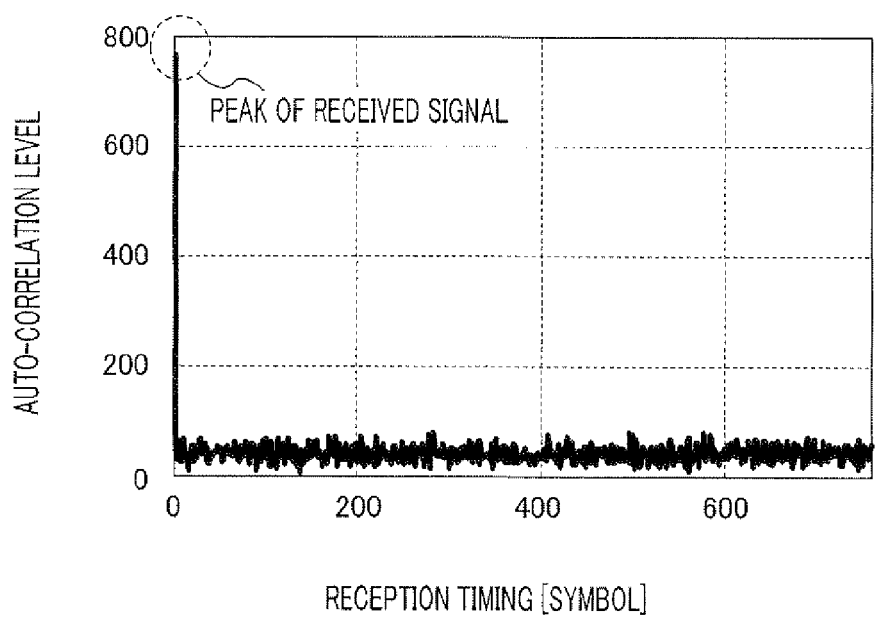
FIG. 15A shows a delay profile (0 Hz frequency offset) according to Embodiment 2 of the present invention.
Figure 15B:
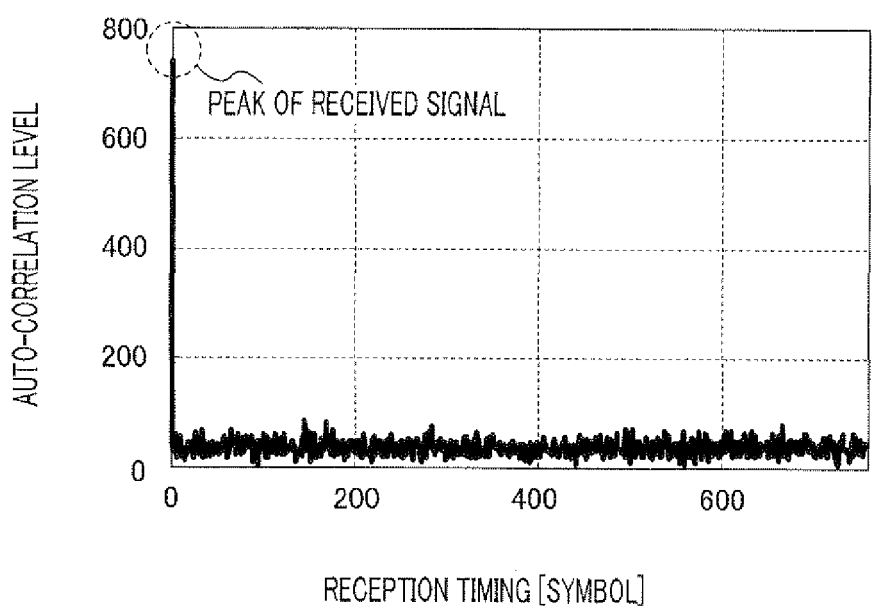
FIG. 15B shows a delay profile (600 Hz frequency offset) according to Embodiment 2 of the present invention.

FIGS. 15A and 15B show delay profiles the present inventors have obtained by computer simulations. Here, as described above, FIG. 15A shows the case of a 0 Hz frequency offset and FIG. 15B shows the case of a 600 Hz frequency offset. In both cases, the TTI length is 1 ms as described above.

As apparent from FIGS. 15A and 15B, according to the present embodiment, as in Embodiment 1, even if frequency offset is added, it is different from conventional cases (FIGS. 2A and 2B) the autocorrelation level of the received signal does not decrease and interference peaks do not occur.

Figure 16:
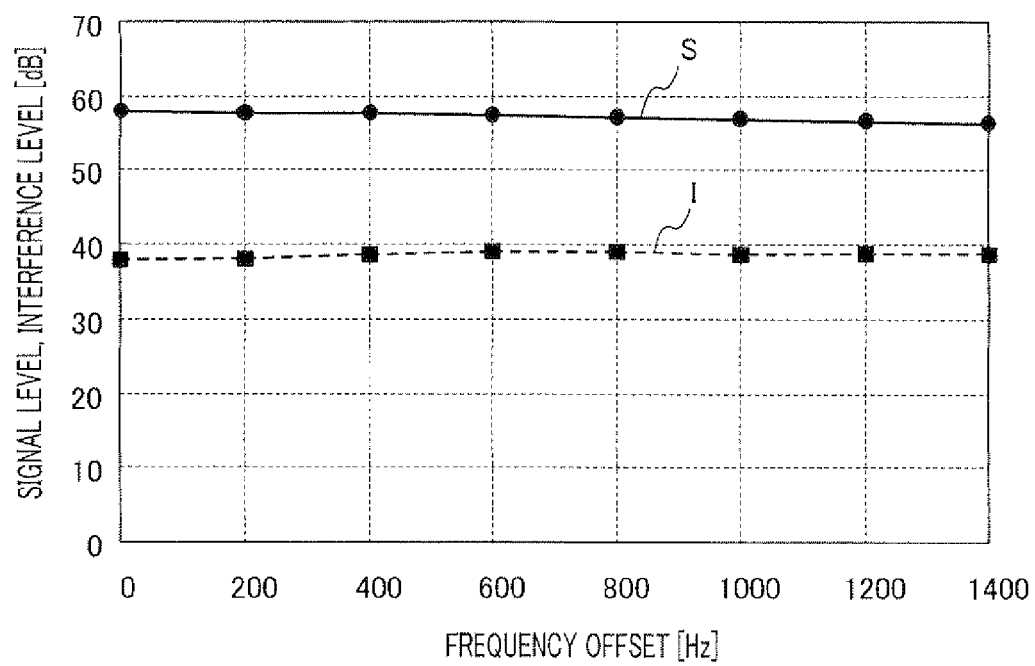
FIG. 16 shows the result of robustness evaluation with respect to frequency offset according to Embodiment 2 of the present invention.

Further, FIG. 16 shows the result of the robustness with respect to frequency offset the present inventors have evaluated by computer simulations. The chart of FIG. 16 shows the maximum value of the signal level and the maximum value of the interference level with respect to the frequency offset as described above. Referring to FIG. 16, according to the present embodiment, as in Embodiment 1, even if frequency offset increases, signal level Sand interference level I change little. Further, even if the frequency offset exceeds 700 Hz, signal level S is much greater than interference level I. That is, according to the present embodiment, it is possible to detect a preamble accurately.

In this way, according to the present embodiment, by interleaving and randomizing a ZC sequence or a CS-ZC sequence used as preambles, the present embodiment has the same working effect and provides the same advantage as Embodiment 1.

Embodiment 3

The present embodiment differs from Embodiment 1 in randomizing a ZC sequence or a CS-ZC sequence, by interleaving the ZC sequence or the CS-ZC sequence and then by multiplying the interleaving result by PN sequences.

Figure 17:
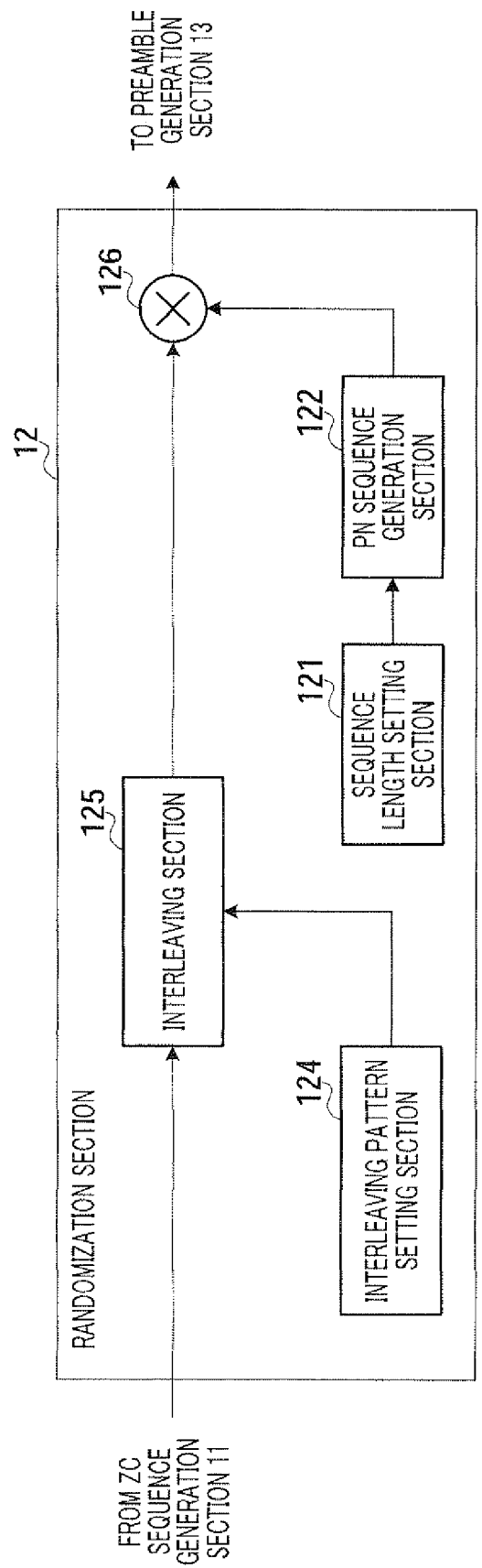
FIG. 17 is a block diagram showing the configuration of the randomization section according to Embodiment 3 of the present invention.

FIG. 17 shows the configuration of randomization section 12 according to the present embodiment. In FIG. 17, the same reference numerals will be assigned to the same components as in FIG. 6 (Embodiment 1) and FIG. 13 (Embodiment 2), and description thereof will be omitted.

In randomization section 12 shown in FIG. 17, multiplication section 126 multiplies the CS-ZC sequence after interleaving by the extended PN sequence received as input from PN sequence generation section 122, and outputs the multiplied sequence to preamble generation section 13.

In this way, according to the present embodiment, after interleaving a CS-ZC sequence received as input from ZC sequence generation section 11, randomization section 12 multiplies the interleaved CS-ZC sequence by the extended PN sequence received as input from PN sequence generation section 122, to randomize the CS-ZC sequence. That is, randomization section 12 according to the present embodiment randomizes the CS-ZC sequence in two steps.

Further, with the present embodiment, the first step randomization is carried out by interleaving, and the second step randomization is carried out by multiplying a PN sequence. This order of randomization is important. That is, this is because, if randomization by multiplying a PN sequence is carried out in the first step and randomization by interleaving is carried out in the second step, good correlation characteristics of a PN sequence are lost by the interleaving.

Figure 18:
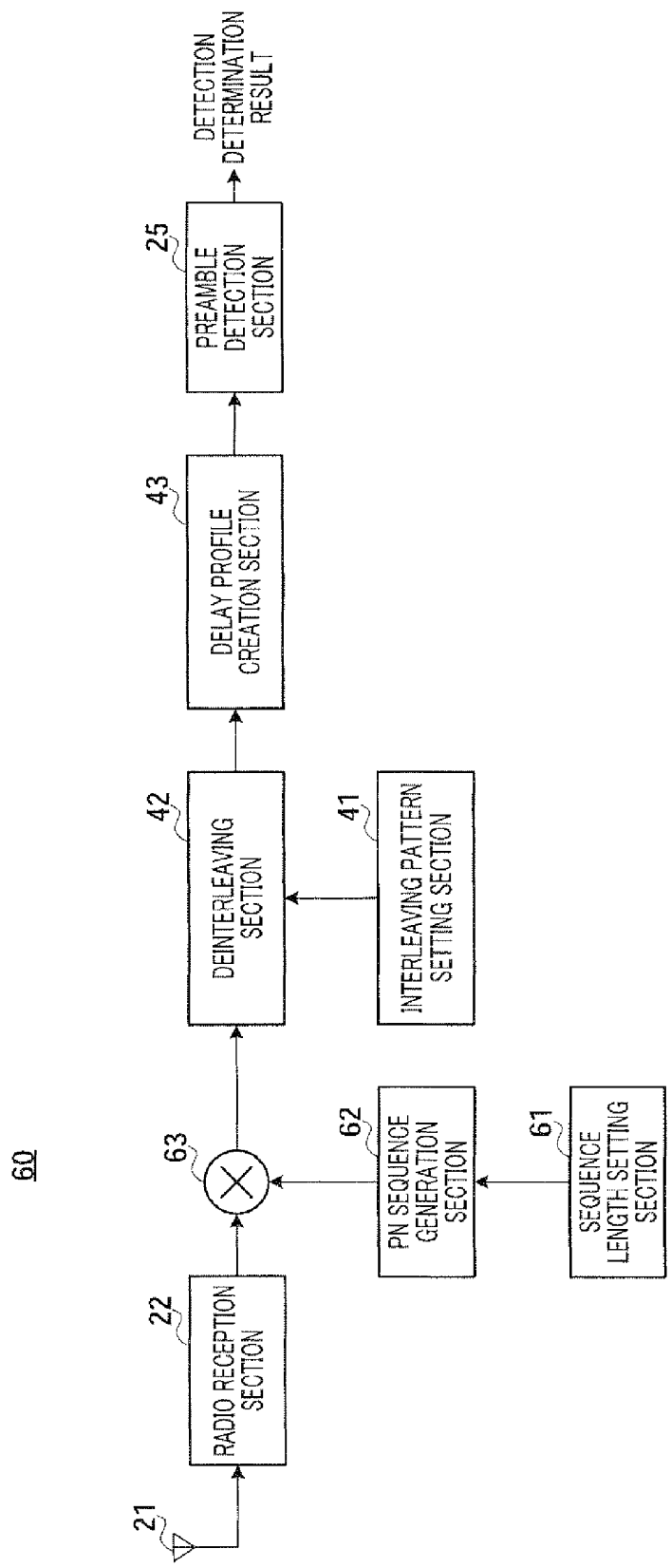
FIG. 18 is a block diagram showing the configuration of the radio communication apparatus (preamble receiving side) according to Embodiment 3 of the present invention.

Next, FIG. 18 shows radio communication apparatus 60 of the preamble receiving side according to the present embodiment. In FIG. 18, the same reference numerals will be assigned to the same components as in FIG. 8 (Embodiment 1) and FIG. 14 (Embodiment 2), and description thereof will be omitted.

In radio communication apparatus 60 shown in FIG. 18, sequence length setting section 61 sets the same PN sequence length as the PN sequence length set by sequence length setting section 121 shown in FIG. 17, in PN sequence generation section 62.

PN sequence generation section 62 generates a PN sequence having a length set by sequence length setting section 61, extends this generated PN sequence to the ZC sequence length as in PN sequence generation section 122 shown in FIG. 17, and outputs the extended PN sequence to multiplication section 63.

Multiplication section 63 multiplies the preamble of a received signal by complex conjugate of the extended PN sequence received as input from PN sequence generation section 62 and outputs the multiplied preamble to deinterleaving section 42.

In this way, according to the present embodiment, randomization is performed for a ZC sequence or a CS-ZC sequence in two steps, so that the effect obtained by Embodiments 1 and 2 can improve further.

Embodiment 4

The present embodiment differs from Embodiment 1 in randomizing a ZC sequence or a CS-ZC sequence in cases where frequency offset level exceeds a threshold value.

Figure 19:
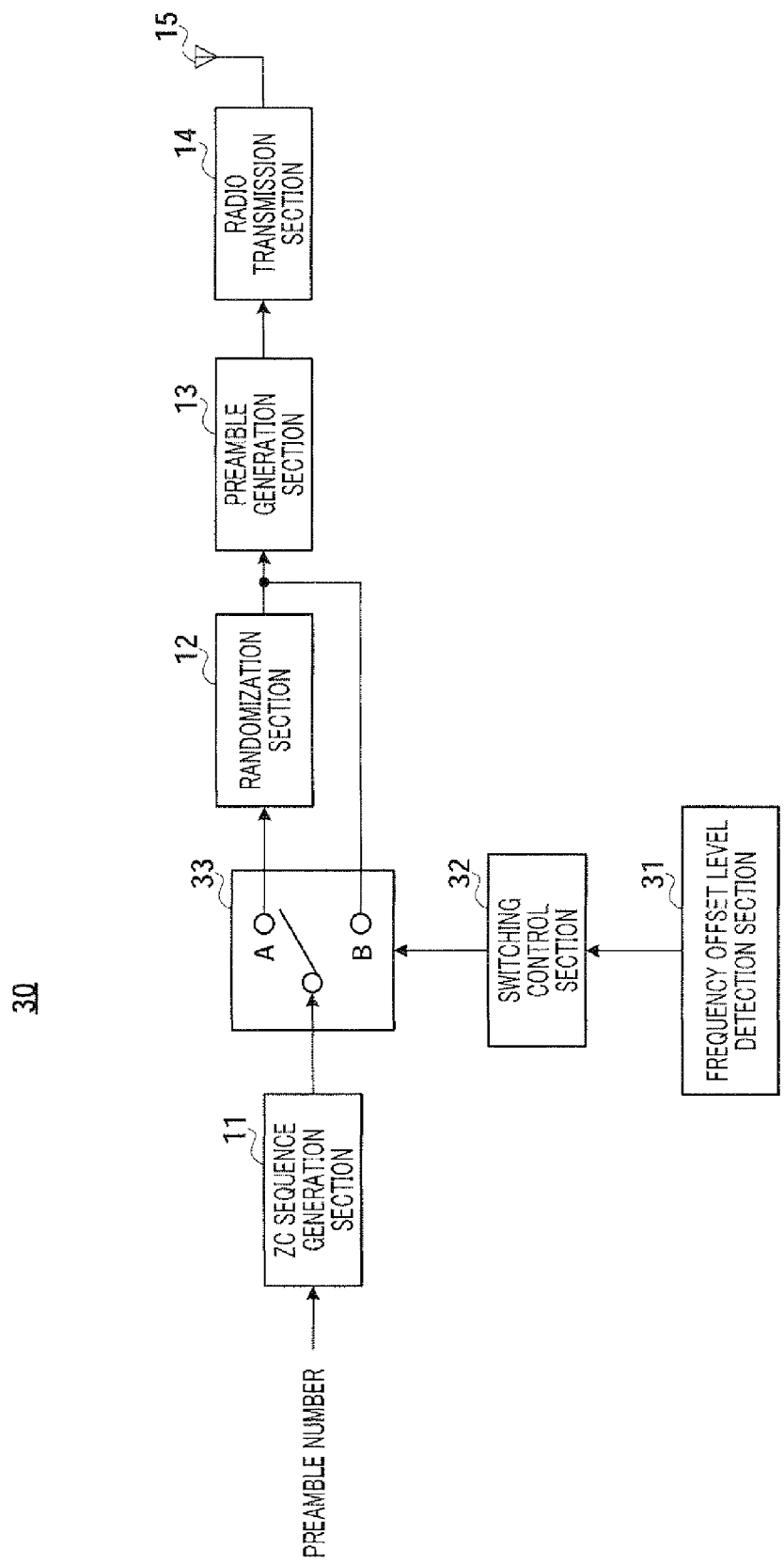
FIG. 19 is a block diagram showing the configuration of the radio communication apparatus (preamble transmitting side) according to Embodiment 4 of the present invention.

FIG. 19 shows the configuration of a radio communication apparatus 30 of the preamble transmitting side according to the present embodiment. In FIG. 19, the same reference numerals will be assigned to the same components as in FIG. 5 (Embodiment 1), and description thereof will be omitted. Further, randomization section 12 shown in FIG. 19 may be any of FIG. 6 (Embodiment 1), FIG. 13 (Embodiment 2) and FIG. 17 (Embodiment 3). That is, the present embodiment can be implemented in combination of Embodiments 1 to 3.

As shown in radio communication apparatus 30 shown in FIG. 19, frequency offset level detection section 31 detects a frequency offset level using a received signal (e.g. known signal such as SCH (synchronization channel)). To be more specific, frequency offset level detection section 31 detects a frequency offset level by averaging the amount of phase fluctuation for a predetermined time. Frequency offset level detection section 31 outputs the detected frequency offset level to switching control section 32. Further, in cases where radio communication apparatus 30 is used with a mobile station apparatus of mobile communication system, the magnitude of frequency offset level is proportional to the magnitude of moving speed of a mobile station apparatus or the magnitude of a clock difference (base clock difference) between the mobile station and the base station.

Switching control section 32 compares the detected frequency offset level with a threshold, and controls switching section 33 according to the comparison result. When the detected frequency offset level exceeds the threshold, switching control section 32 switches switching section 33 to the A side. On the other hand, when the detected frequency offset level is equal to or lower than the threshold, switching control section 33 switches switching section 33 to the B side. That is, the CS-ZC sequence generated in ZC sequence generation section 11 is inputted to preamble generation section 13 via randomization section 12 in the former case, and inputted to preamble generation section 13 directly by passing randomization section 12 in the latter case. Consequently, the CS-ZC sequence is randomized only in cases where the frequency offset level exceeds the threshold.

In this way, according to the present embodiment, only when the frequency offset level exceeds a threshold and it is likely to deteriorate the accuracy of preamble detection, randomization is performed, and, when the frequency offset level is equal to or less than the threshold and it is possible to meet the accuracy of preamble detection sufficiently, randomization is not performed, so that it is possible to prevent unnecessary randomization in a situation of a low frequency offset level.

Embodiment 5

The present embodiment differs from Embodiment 1 in using a ZC sequence as a random sequence.

Figure 20:
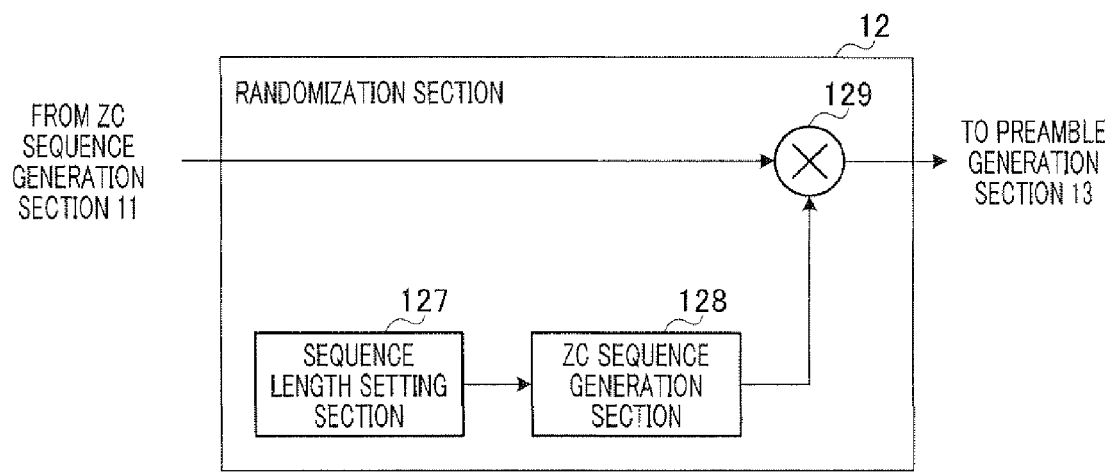
FIG. 20 is a block diagram showing the configuration of the randomization section according to Embodiment 5 of the present invention.

FIG. 20 shows the configuration of randomization section 12 according to the present embodiment.

In randomization section 12 shown in FIG. 20, sequence length setting section 127 sets the sequence length of a ZC sequence, which is a random sequence, in ZC sequence generation section 128. Sequence length setting section 127 sets the sequence length shorter than the sequence length of a CS-ZC sequence generated in ZC sequence generation section 11, in ZC sequence generation section 128. Further, as in Embodiment 1, this sequence length may be set in the range longer than the maximum propagation delay time in the RACH assumed in advance according to allowable frequency offset. Further, as in Embodiment 1, when a CS-ZC sequence is used as a preamble, this sequence length is preferably set as same as the cyclic shift length of the CS-ZC sequence.

ZC sequence generation section 128 generates a ZC sequence (short ZC sequence) having a length set by sequence length setting section 127, extends this generated short ZC sequence to the sequence length of CS-ZC sequence length generated in ZC sequence generation section 11, and outputs the extended short ZC sequence to multiplication section 129. Here, the sequence length is extended by repeating the same ZC sequence a plurality of times. Now, a ZC sequence after the extension of the sequence length in ZC sequence generation section 128 is referred to as the "extended ZC sequence."

Figure 21:
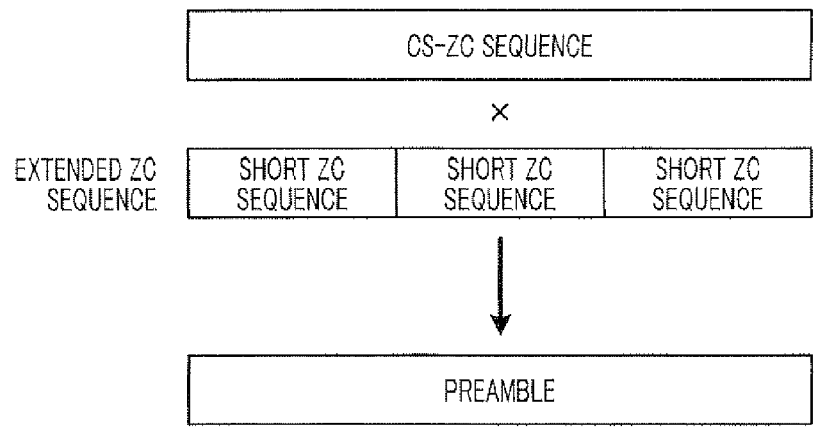
FIG. 21 illustrates the operation of the multiplication section according to Embodiment 5 of the present invention.

Referring to FIG. 21, multiplication section 129 multiplies the CS-ZC sequence received as input from ZC sequence generation section 11 by the extended ZC sequence received as input from ZC sequence generation section 128, and outputs the multiplied sequence to preamble generation section 13. By this means, it is possible to randomize a CS-ZC sequence and remove the nature of a chirp signal from the CS-ZC sequence.

In cases where randomization section 12 randomizes the CS-ZC sequence by this, the operations of radio communication apparatus 20 of preamble receiving side (FIG. 8) are as follows. Here, only the points different from Embodiment 1 will be explained.

That is, number of summations setting section 24 sets one number from one to the number of short ZC sequences used in randomization of the CS-ZC sequence, as summation numbers.

As shown in FIGS. 9 and 10, delay profile creation section 23 performs correlation calculation between the preamble of the received signal and the sequence pattern of the known preamble (i.e. a pattern obtained as a result of multiplying the CS-ZC sequence by the extended ZC sequence) in short ZC sequence length units, to create a delay profile. Then, according to the number of power summations received as input from number of summations setting section 24, delay profile creation section 23 performs power summation of a plurality of delay profiles obtained from the correlation calculation in short ZC sequence length units, and outputs the delay profile after the power summation to preamble detection section 25.

Figure 22A:
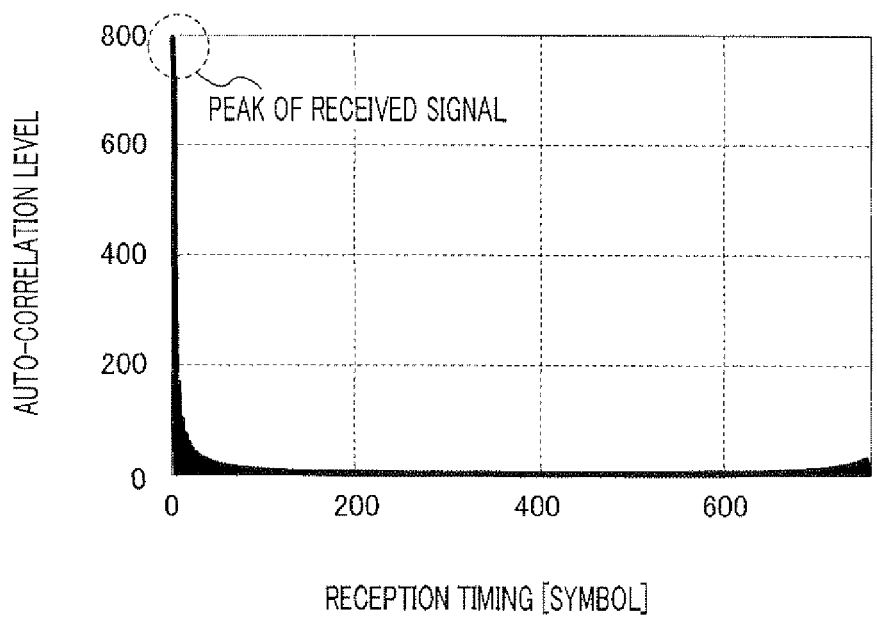
FIG. 22A shows a delay profile (0 Hz frequency offset) according to Embodiment 5 of the present invention.
Figure 22B:
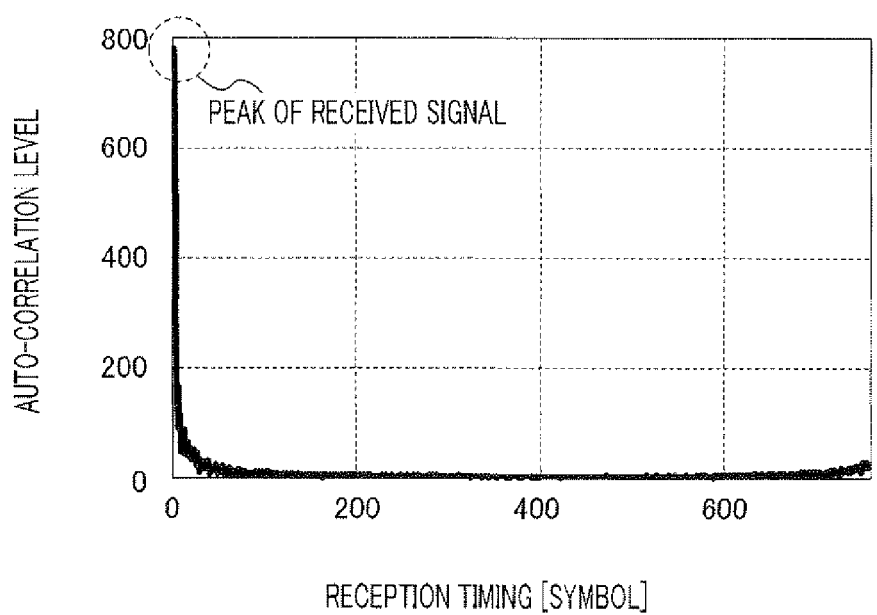
FIG. 22B shows a delay profile (600 Hz frequency offset) according to Embodiment 5 of the present invention.

FIGS. 22A and 22B show delay profiles the present inventors have obtained by computer simulations. Here, as described above, FIG. 22A shows the case of a 0 Hz frequency offset and FIG. 22B shows the case of a 600 Hz frequency offset. In both cases, the TTI length is 1 ms as described above.

As apparent from FIGS. 22A and 22B, according to the present embodiment, as in Embodiment 1, even if frequency offset is added, it is different from conventional cases (FIGS. 2A and 2B) the autocorrelation level of the received signal does not decrease and interference peaks do not occur.

In this way, by using a short ZC sequence as a random sequence, the present embodiment provides the same working effect and advantage as in Embodiment 1.

Embodiment 6

The present embodiment differs from Embodiment 1 in randomizing a ZC sequence or a CS-ZC sequence by interleaving the ZC sequence or the CS-ZC sequence and then by multiplying the interleaving result by ZC sequences.

Figure 23:
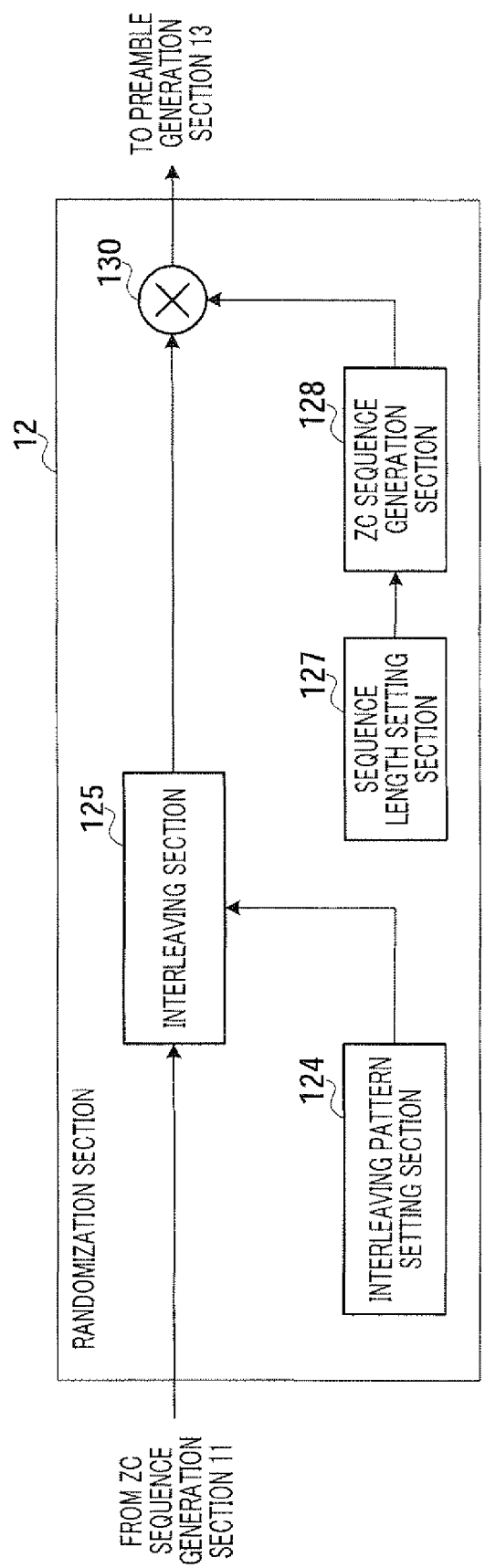
FIG. 23 is a block diagram showing the configuration of the randomization section according to Embodiment 6 of the present invention.

FIG. 23 shows the configuration of randomization section 12 according to the present embodiment. In FIG. 23, the same reference numerals will be assigned to the same components as in FIG. 13 (Embodiment 2) and FIG. 20 (Embodiment 5), and description thereof will be omitted.

In randomization section 12 shown in FIG. 23, multiplication section 130 multiplies the CS-ZC sequence after interleaving by the extended ZC sequence received as input from ZC sequence generation section 128, and outputs the multiplied sequence to preamble generation section 13.

In this way, according to the present embodiment, after interleaving a CS-ZC sequence received as input from ZC sequence generation section 11, randomization section 12 multiplies the interleaved CS-ZC sequence by the extended ZC sequence received as input from ZC sequence generation section 128, to randomize the CS-ZC sequence. That is, randomization section 12 according to the present embodiment randomizes the CS-ZC sequence in two steps as in Embodiment 3.

Further, with the present embodiment, the first step randomization is carried out by interleaving, and the second step randomization is carried out by multiplying a ZC sequence. This order of randomization is important. That is, this is because, if randomization by multiplying a ZC sequence is carried out in the first step and randomization by interleaving is carried out in the second step, good correlation characteristics of a ZC sequence are lost by the interleaving.

Figure 24:
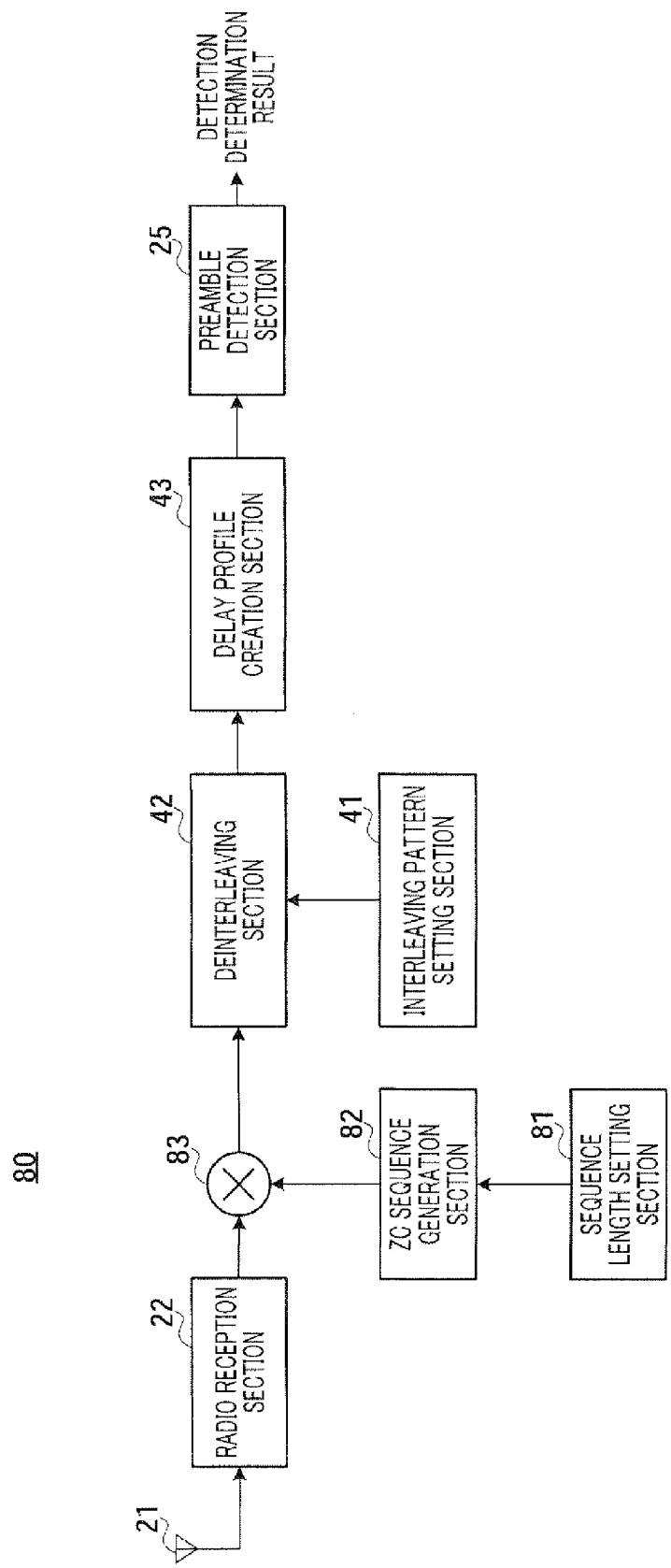
FIG. 24 is a block diagram showing the configuration of the radio communication apparatus (preamble receiving side) according to Embodiment 6 of the present invention.

Next, FIG. 24 shows radio communication apparatus 80 of the preamble receiving side according to the present embodiment. In FIG. 24, the same reference numerals will be assigned to the same components as in FIG. 8 (Embodiment 1) and FIG. 14 (Embodiment 2), and description thereof will be omitted.

In radio communication apparatus 80 shown in FIG. 24, sequence length setting section 81 sets the same sequence length as the sequence length set by sequence length setting section 127 shown in FIG. 23, in ZC sequence generation section 82.

ZC sequence generation section 82 generates a short ZC sequence having a length set by sequence length setting section 81, extends this generated short ZC sequence to the ZC sequence length as in ZC sequence generation section 128 shown in FIG. 23, and outputs the extended ZC sequence to multiplication section 83.

Multiplication section 83 multiplies the preamble of a received signal by complex conjugate of the extended ZC sequence received as input from ZC sequence generation section 82 and outputs the multiplied preamble to deinterleaving section 42.

In this way, according to the present embodiment, randomization is performed for a ZC sequence or a CS-ZC sequence in two steps, so that, similar to Embodiment 3, the effect obtained by Embodiments 1 and 2 can improve further.

Embodiment 7

In a ZC sequence, if sequence length N is a prime number, the cross-correlation between ZC sequences is $\sqrt{N}$, and the cross-correlation becomes very low. Meanwhile, when randomization is performed using an extended PN sequence formed with a plurality of PN sequences or an extended ZC sequence formed with a plurality of ZC sequences, if sequence length N of a ZC sequence or a CS-ZC sequence, which is randomized, is a prime number, sequence length N and the sequence length of an extended PN sequence or an extended ZC sequence are not likely to match. For example, where sequence length N is a prime number 769, if the sequence length of the three PN sequences forming an extended PN sequence is 255, the sequence length of the extended PN sequence is 255×3=765, and, therefore, sequence length N and the sequence length of an extended PN sequence do not match.

Then, with the present embodiment, in cases where sequence length N of a ZC sequence or a CS-ZC sequence and the sequence length of an extended PN sequence or an extended ZC sequence do not match, one of the sequence lengths is adjusted and matched with these sequence lengths.

Figure 25:
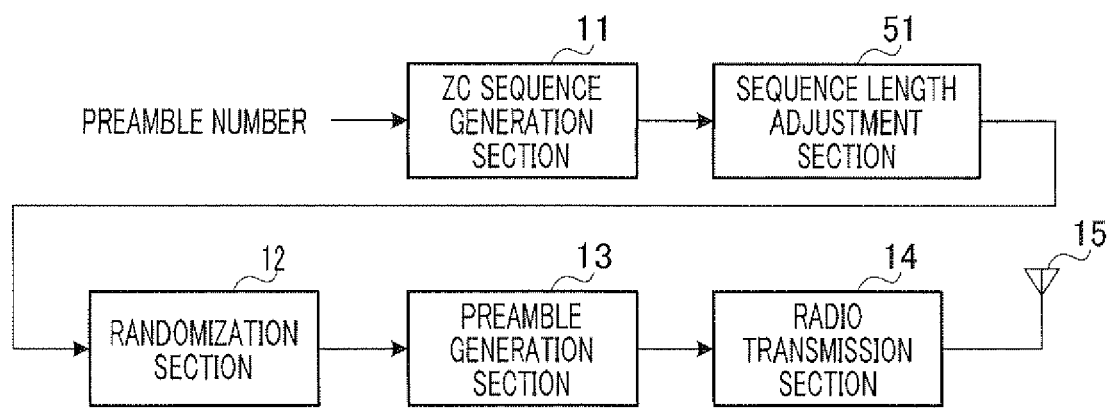
FIG. 25 is a block diagram showing the configuration of the radio communication apparatus (preamble transmitting side) according to Embodiment 7 of the present invention.

FIG. 25 shows a configuration of radio communication apparatus 50 of preamble transmitting side, according to the present embodiment. In FIG. 25, the same reference numerals will be assigned to the same components as in FIG. 5 (Embodiment 1), and description thereof will be omitted. Further, although a case will be explained below to perform randomization using PN sequences, the case may be also implemented in combination of the present embodiment and Embodiment 5 (i.e. randomization using ZC sequences).

In radio communication apparatus 50, in cases where sequence length N of a CS-ZC sequence received as input from ZC sequence generation section 11 and the sequence length of an extended PN sequence do not match, sequence length adjustment section 51 performs processing to adjust sequence length N, and outputs the CS-ZC sequence after the adjustment of the sequence length to randomization section 12.

Figure 26A:
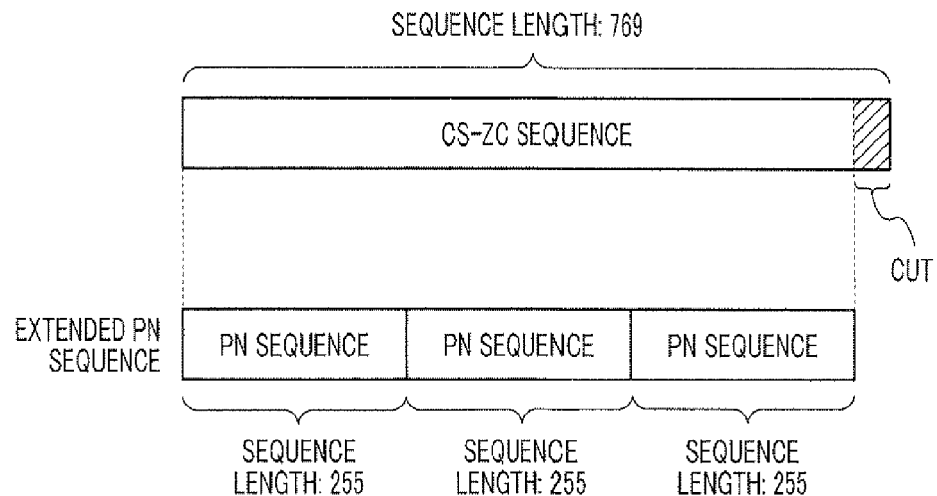
FIG. 26A illustrates the operation of the sequence length adjustment section (in cases where sequence length N is longer than the sequence length of an extended PN sequence), according to Embodiment 7 of the present invention.

<Where Sequence Length N is Longer Than the Sequence Length of an Extended PN Sequence: FIG. 26A>

As shown in FIG. 26A, for example, if sequence length N is a prime number 769, but the sequence length of extended PN sequence is 765 (255×3), sequence length adjustment section 51 cuts a part of the CS-ZC sequence (here, four chips) and matches the sequence length of the extended PN sequence with the sequence length of the CS-ZC sequence. If the number of chips to be cut is a few, there is not a problem because deterioration of correlation characteristics is little. Further, the part to be cut is not limited to the end of the sequence and may also be a middle part.

Figure 26B:
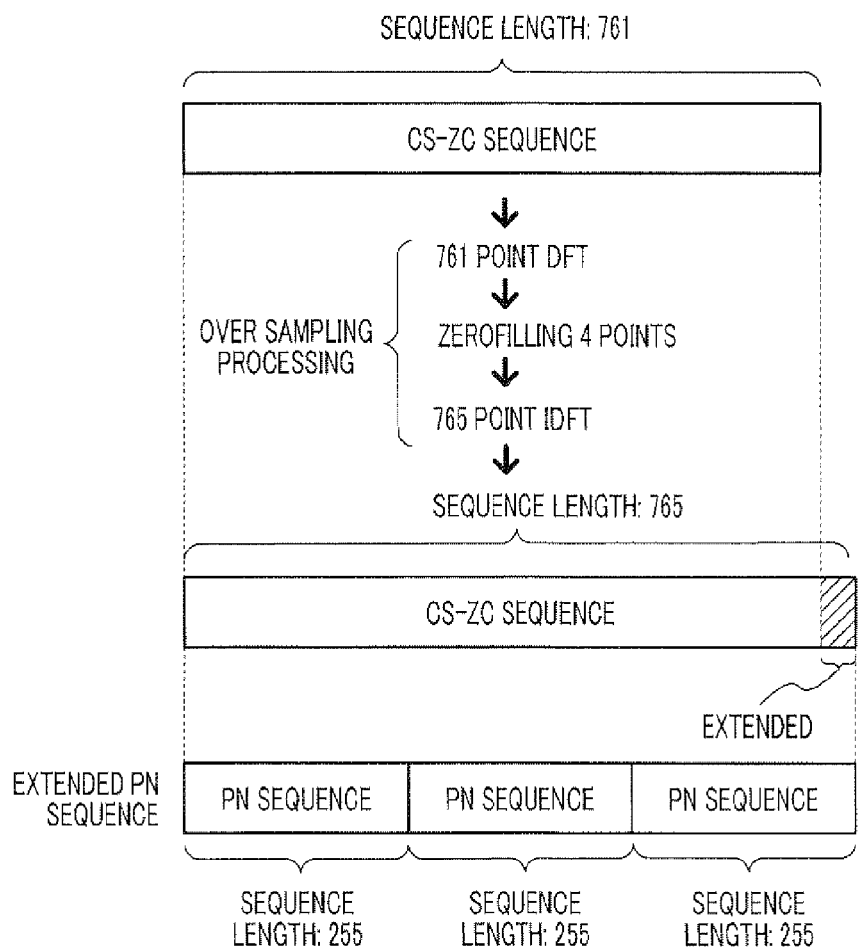
FIG. 26B illustrates the operation of the sequence length adjustment section (in cases where sequence length N is shorter than the sequence length of an extended PN sequence), according to Embodiment 7 of the present invention.

<Where Sequence Length N is Shorter Than the Sequence Length of an Extended PN Sequence: FIG. 26B>

As shown in FIG. 26B, for example, if sequence length N is a prime number 761, but the sequence length of extended PN sequence is 765 (255×3), sequence length adjustment section 51 extends the CS-ZC sequence by the following oversampling processing and matches the sequence length of the extended PN sequence with the sequence length of the CS-ZC sequence.

Sequence length adjustment section 51 performs a 761-point DFT (Discrete Fourier Transform) and converts CS-ZC sequence from the time domain into the frequency domain.

Next, sequence length adjustment section 51 fills zeroes for the difference between sequence length N and the sequence length of the extended PN sequence. Here, this difference is four chips, and sequence length adjustment section 51 zero-fills four-points. By this means, the sample points of the CS-ZC sequence in the frequency domain is extended from 761 points to 765 points.

Then, sequence length adjustment section 51 performs a 765-point IDFT (Inverse Discrete Fourier Transform) over the CS-ZC sequence after the zero-filling, and converts the CS-ZC sequence from the frequency domain into the time domain.

By this series of oversampling processing, the sequence length of the CS-ZC sequence is extended from 761 to 765 and is matched with the sequence length of the extended PN sequence.

If the number of sample points to be zero-filled is a few, there is not a problem because the deterioration of correlation characteristics is little.

Figure 27:
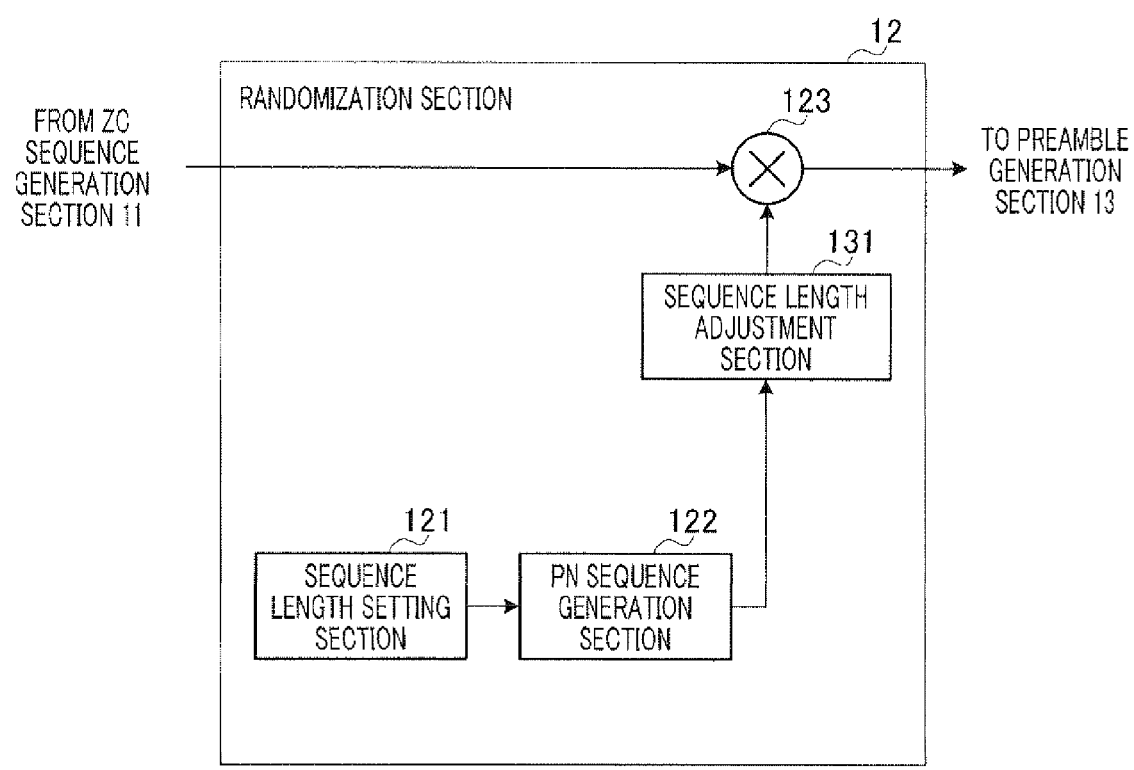
FIG. 27 is a block diagram showing the configuration of the randomization section according to Embodiment 7 of the present invention.

Radio communication apparatus 50 shown in FIG. 25 may have sequence length adjustment section 131 in randomization section 12 as shown in FIG. 27, instead of sequence length adjustment section 51. In cases where the sequence length of the extended PN sequence is longer than sequence length N, in the same manner as the adjustment method shown in FIG. 26A, sequence length adjustment section 131 cuts a part of the extended PN sequence and matches the sequence length of the CS-ZC sequence with the sequence length of the extended PN sequence. On the other hand, in cases where the sequence length of the extended PN sequence is shorter than sequence length N, in the same manner as the adjustment method shown in FIG. 26B, sequence length adjustment section 131 performs oversampling processing for the extended PN sequence and matches the sequence length of the CS-ZC sequence with the sequence length of the extended PN sequence.

In this way, according to the present embodiment, to match the sequence length of a ZC sequence or a CS-ZC sequence with the sequence length of an extended PN sequence or an extended ZC sequence, it is possible to randomize a ZC sequence or a CS-ZC sequence while suppressing the deterioration of correlation characteristics, even when their sequence lengths are different.

Embodiments of the present invention have been explained.

Although cases have been explained with the embodiments where the present invention is applicable to a ZC sequence or a CS-ZC sequence, the present invention may be applicable to a GCL sequence (i.e. Generalized Chirp-Like sequence), which is generated by modulating a ZC sequence, and which is represented by c (k) in equation 4. Here, N is the sequence length, and N=s×m² (s and m are integers) or N=t×m (t and m are integers). Further, a(k) is one of ZC sequences shown in equation 1 and b(k) is an arbitrary sequence of the constant amplitude (k=0, . . . , m).

(Equation 4)

$$c(k)=a(k)b(k \bmod m), k=0, 1, \ldots, N-1 \quad [4]$$

Further, the present invention may also be applicable to preambles where sequence extension method is used and to preambles where sequence repetition method is used. The interval of subcarrier frequency (i.e. a sampling frequency/ZC sequence length) decreases when the ZC sequence length is longer, and therefore the influence of frequency offset increases when the ZC sequence length is longer. For this reason, when the sequence extension method, which makes the ZC sequence length as a preamble longer, is used, compared to a case of using the sequence repetition method, the influence of frequency offset increases. That is, it is more effective to apply the present invention to preambles where the sequence extension method is used. By applying preambles using the sequence extension method to the present invention, it is possible to prevent performance deterioration due to the influence of frequency offset while maintaining the advantage of the sequence extension method.

Further, although cases have been explained with the embodiments where a ZC sequence or a CS-ZC sequence is used as a RACH preamble, the present invention is not limited to this, the present invention may be applicable to all communication using a ZC sequence or a CS-ZC sequence. For example, in cases where a ZC sequence or a CS-ZC sequence is used as a pilot signal for channel estimation and a pilot signal for synchronization channel, the ZC sequence or the CS-ZC sequence may be randomized as described above. By this means, it is possible to prevent performance deterioration of a pilot signal for channel estimation and a pilot signal for synchronization channel due to influence of frequency offset.

Further, the present invention may be applicable to only a part of ZC sequences available in the mobile stations.

Figure 28:
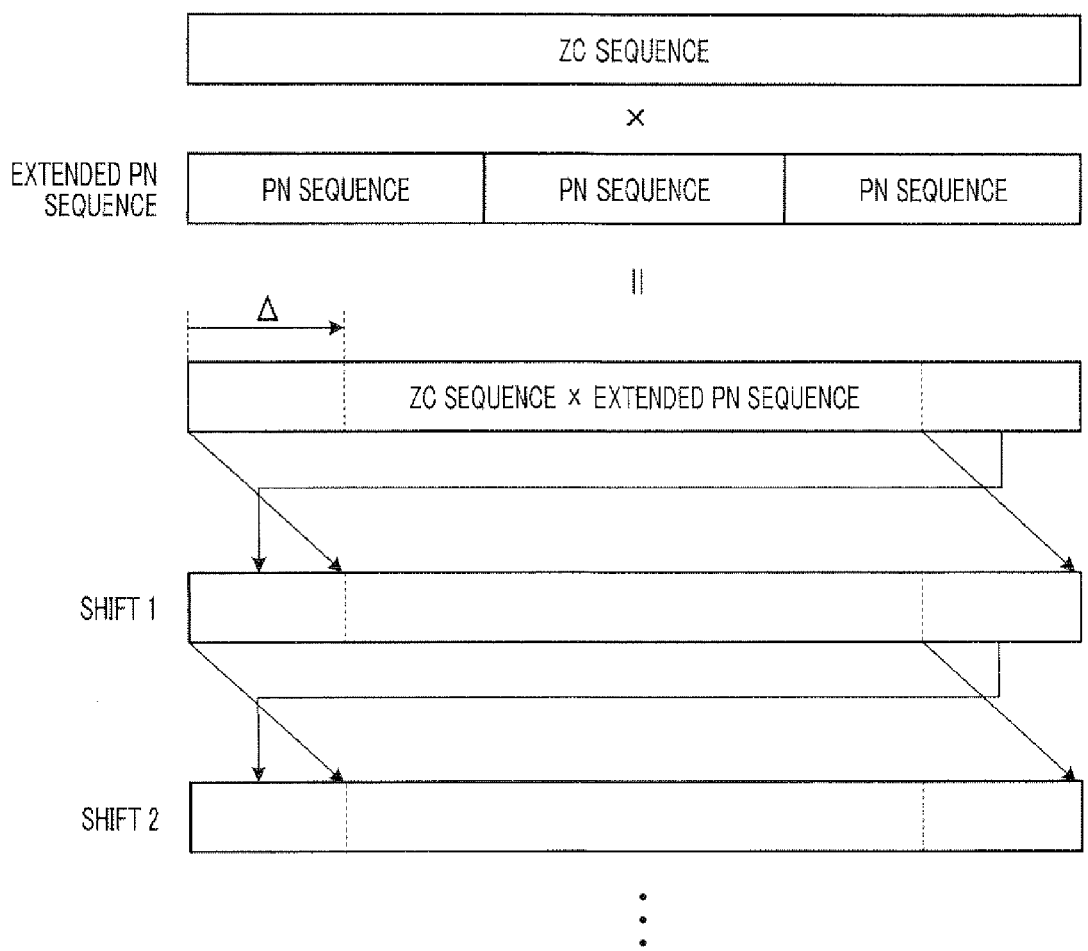
FIG. 28 shows a generation method of a randomized CS-ZC sequence.

Further, although cases have been explained with the embodiments where a CS-ZC sequence is multiplied by an extended PN sequence (or extended ZC sequence), the method of randomizing a CS-ZC sequence is not limited to this. For example, as shown in FIG. 28, by multiplying a ZC sequence by an extended PN sequence (or extended ZC sequence) and then by cyclically shifting the multiplied result by the amount of shift Δ, a randomized CS-ZC sequence may be generated. When this randomized CS-ZC sequence is generated, in the radio communication apparatus of the preamble receiving side is able to detect the correlations of a plurality of different CS-ZC sequences in a collective manner, so that it is possible to reduce the amount of processing for detecting preambles. To be more specific, the radio communication apparatus of the preamble receiving side performs complex division on the frequency characteristic of a received signal obtained by performing a DFT on the received signal by the frequency characteristic of a ZC sequence obtained by performing a DFT on the ZC sequence with the zero amount of shift, and performs an IDFT on the divided result, so that it is possible to obtain delay profiles of all CS-ZC sequences in a collective manner.

Further, the base station in the explanation of the above embodiments may be referred to as "Node B" and the mobile station may be referred to as "UE."

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2006-275640, filed on Oct. 6, 2006, and Japanese Patent Application No. 2006-298179, filed on Nov. 1, 2006, including the specifications, drawings and abstracts, are incorporated herein by reference in their entirety.

INDUSTRIAL APPLICABILITY

The present invention is applicable to, for example, mobile communication systems.

The invention claimed is:

1. A radio communication apparatus comprising:
a randomization section that randomizes a cyclic-shifted Zadoff-Chu sequence by multiplying the cyclic-shifted Zadoff-Chu sequence by a random sequence having a same length as a cyclic shift length of the cyclic-shifted Zadoff-Chu sequence; and
a transmitting section that transmits the randomized cyclic-shifted Zadoff-Chu sequence.

2. The radio communication apparatus according to claim 1, wherein the transmitting section transmits the randomized cyclic-shifted Zadoff-Chu sequence as a random access preamble.

3. The radio communication apparatus according to claim 1, wherein the random sequence comprises a sequence having a sequence length according to a maximum propagation delay time of a random access channel.

4. The radio communication apparatus according to claim 1, wherein the randomization section multiplies a pseudo noise sequence, an M sequence, a Gold sequence, an orthogonal Gold sequence or a Walsh-Hadamard sequence as the random sequence.

5. The radio communication apparatus according to claim 1, wherein the randomization section interleaves another cyclic-shifted Zadoff-Chu sequence, and then further multiplies the interleaving result by a random sequence, to perform randomization of the another cyclic-shifted Zadoff-Chu sequence.

6. The radio communication apparatus according to claim 1, wherein the randomization section performs the randomization when a frequency offset level exceeds a threshold value.

7. A mobile station apparatus comprising the radio communication apparatus according to claim 1.

8. A radio communication method comprising:
randomizing a cyclic-shifted Zadoff-Chu sequence by multiplying the cyclic-shifted Zadoff-Chu sequence by a random sequence having a same length as a cyclic shift length of the cyclic-shifted Zadoff-Chu sequence; and
transmitting the randomized cyclic-shifted Zadoff-Chu sequence.

* * * * *